United States Patent
Kumar

(10) Patent No.: US 10,075,820 B2
(45) Date of Patent: *Sep. 11, 2018

(54) SECURE BROADCAST BEACON COMMUNICATIONS

(71) Applicant: Derek D. Kumar, San Jose, CA (US)

(72) Inventor: Derek D. Kumar, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/826,431

(22) Filed: Nov. 29, 2017

(65) Prior Publication Data

US 2018/0091957 A1    Mar. 29, 2018

Related U.S. Application Data

(63) Continuation of application No. 15/633,622, filed on Jun. 26, 2017, now Pat. No. 9,860,718, which is a continuation of application No. 14/875,657, filed on Oct. 5, 2015, now Pat. No. 9,763,063.

(60) Provisional application No. 62/074,179, filed on Nov. 3, 2014, provisional application No. 62/060,177, filed on Oct. 6, 2014.

(51) Int. Cl.
| | |
|---|---|
| *H04L 29/06* | (2006.01) |
| *H04W 4/06* | (2009.01) |
| *H04W 12/06* | (2009.01) |
| *H04W 4/80* | (2018.01) |
| *H04W 12/10* | (2009.01) |

(52) U.S. Cl.
CPC ............ *H04W 4/06* (2013.01); *H04L 63/123* (2013.01); *H04W 4/80* (2018.02); *H04W 12/06* (2013.01); *H04W 12/10* (2013.01)

(58) Field of Classification Search
CPC .............................. H04L 63/08; H04L 63/123
See application file for complete search history.

(56) References Cited

U.S. PATENT DOCUMENTS

| | | | | |
|---|---|---|---|---|
| 9,038,142 | B2* | 5/2015 | Vongsouvanh | H04L 63/0492 726/4 |
| 9,064,225 | B2* | 6/2015 | Nakra | G06Q 10/0833 |
| 9,544,075 | B2* | 1/2017 | Altman | H04H 60/90 |

(Continued)

*Primary Examiner* — Ali Shayanfar
(74) *Attorney, Agent, or Firm* — Chhabra Law Firm, PC

(57) ABSTRACT

Using various embodiments, methods and systems for secure Bluetooth Low Energy communications, in an unconnected state, are described herein. In one embodiment, conventional BLE transmitting device data can be supplemented with authentication information, including a message authentication field which enables receivers to determine if the received beacon/transmitted BLE peripheral data is genuine. In another embodiment, the authentication data can also include a time varying value field in order to prevent unintentional acceptance of transmitting device data from unauthorized replicated BLE peripherals. In one embodiment, the transmitting device computes an authentication tag using at least a secret key known to the receiving device and transmits the authentication tag to the receiving device. The receiving device can compute an authentication value using the secret key and other transmitting device information and determine if the transmitting device data is genuine by comparing the computed authentication value and the received the authentication tag.

20 Claims, 12 Drawing Sheets

(56) References Cited

U.S. PATENT DOCUMENTS

| | | | | |
|---|---|---|---|---|
| 2014/0114775 A1* | 4/2014 | Cloin | ............... | G06Q 50/12 |
| | | | | 705/15 |
| 2014/0282877 A1* | 9/2014 | Mahaffey | ............ | H04L 63/0853 |
| | | | | 726/3 |
| 2014/0282974 A1* | 9/2014 | Maher | ............... | H04L 63/08 |
| | | | | 726/7 |
| 2015/0332258 A1* | 11/2015 | Kurabi | ............ | G06Q 20/382 |
| | | | | 705/71 |
| 2015/0351084 A1* | 12/2015 | Werb | ............... | H04W 12/08 |
| | | | | 370/329 |
| 2015/0356289 A1* | 12/2015 | Brown | ............... | G06F 21/44 |
| | | | | 726/7 |
| 2016/0057626 A1* | 2/2016 | O'Toole | ............ | H04W 12/08 |
| | | | | 726/4 |
| 2016/0078738 A1* | 3/2016 | Basalamah | ........ | G06K 7/10366 |
| | | | | 340/8.1 |
| 2016/0234683 A1* | 8/2016 | Bone | ............... | H04L 63/062 |
| 2016/0248629 A1* | 8/2016 | Erdmann | ............ | H04W 24/02 |

\* cited by examiner

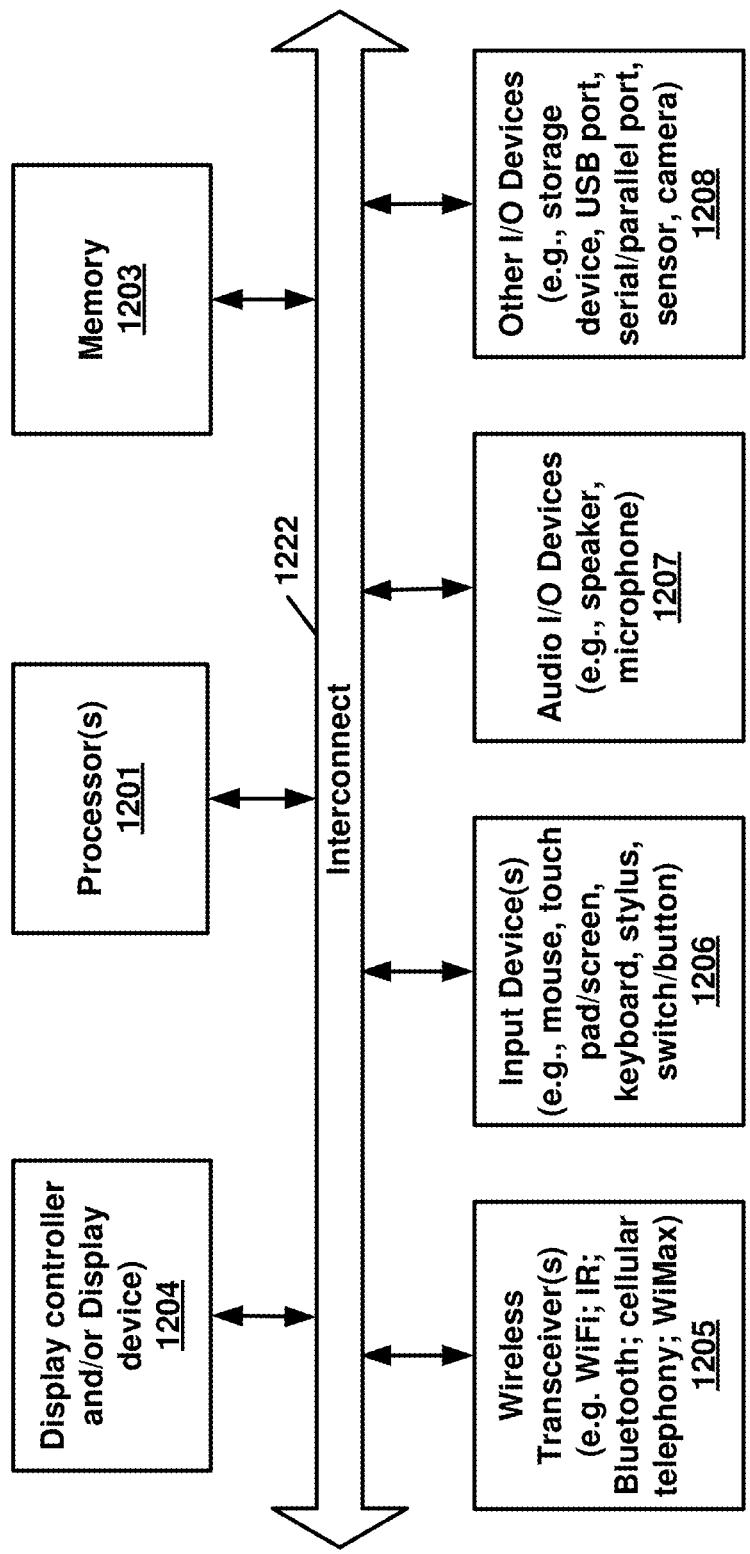
FIG. 12    1200

SECURE BROADCAST BEACON COMMUNICATIONS

CROSS REFERENCE TO RELATED APPLICATIONS

The present application is a continuation of U.S. patent application Ser. No. 15/633,622, filed on Jun. 26, 2017, which is a continuation of U.S. Pat. No. 9,763,063, filed on Oct. 5, 2015, entitled "Secure Broadcast Beacon Communications," and which further claims priority from U.S. Provisional Patent Application No. 62/060,177 filed on Oct. 6, 2014, and is titled "METHOD AND SYSTEM FOR SECURE BROADCAST BEACON COMMUNICATIONS," and U.S. Provisional Patent Application No. 62/074,179 filed on Nov. 3, 2014, and is also titled "METHOD AND SYSTEM FOR SECURE BROADCAST BEACON COMMUNICATIONS," under 35 U.S.C. 119(e).

FIELD OF THE INVENTION

Embodiments of the present invention relates generally to wireless communications. More particularly, embodiments of the invention relate to secure communications between two devices using Bluetooth Low Energy technology.

BACKGROUND OF THE INVENTION

Bluetooth Low Energy (BLE) is a radio frequency (RF) transmission technology and a communications protocol which facilitates low power communications between devices, especially mobile devices with limited battery life. BLE is widely implemented in consumer electronics devices, including Smartphones and tablets that can act as transmitting or receiving devices.

An advantage of BLE, when compared to Wi-Fi (i.e., IEEE 802.11), is that BLE devices have lower power consumption and lower cost of implementation (due to the lower system complexity and minimal infrastructure needs). Efficient data packet format and protocol design are important in designing BLE inter-device communication system because packets consume network bandwidth and device power, especially during transmission, both of which are usually very limited in typical BLE operating environments.

While typical Bluetooth communications occur in a paired (connected) state, BLE technology lets devices exchange information in a non-connected state, that is, the devices need not to be paired. BLE technology allows non-connected devices to communicate by transmitting and receiving data packets having a particular data format. Each BLE packet can be between 80 to 376 bits in length, and has a preamble, access address, Packet Data Unit (PDU), and a Cyclic Redundancy Check (CRC) calculated over the PDU. In the unconnected state, a BLE data packet can be transmitted as a BLE advertising packet or optionally as a BLE scan response packet. Advertising packets and scan response packets both share the same data format as mentioned above, and both are transmitted as advertising events. Similarly, in the unconnected state, a receiver can transmit a BLE data packet as scan response request packet to a BLE enabled transmitter.

Recently, BLE technology, at least due to the above mentioned advantages, has been implemented in wireless beacons for communication with portable or mobile wireless devices. Beacons are BLE technology based devices that transmit information (broadcast message) at regular intervals in order that receivers (receiving devices) may receive the beacon data and perform specific actions, depending on the determined location characteristics. The determined proximity or location information may be very coarse, for example, simply a determination of a receiver being in-range or out-of-range of a specific beacon, or the information may be more specific so as to permit range estimation between a specific beacon and receiver.

The beacon transmits the advertising packet data at regular intervals. It is a form of broadcast data, without a specific intended receiver. For example, a retailer may wish to provide a special offer or coupon, which may appear on the Smartphone receiving device, to customers who are physically present at a retail location. The beacon, in general, does not create the offer directly but the detected position of the receiving device with respect to the beacon can cause the action to occur. Transmitted beacon data may be received by many receivers simultaneously, and for mobile devices, the determined characteristics may rapidly change as the location of the receiving devices varies with respect to the beacon location.

In the non-connected state, a BLE technology based beacon transmits advertising data packets and can transmit scan response data packets when requested. The size of the available payload data in the BLE advertising data packets is relatively small, up to thirty one (31) bytes. Generally, most of the payload data is occupied by the advertising data the transmitting device intends to communicate to the receiving device. The advantage of using a scan response mode of operation (i.e., active scanning) is that it permits additional (extra) information to be transmitted from the beacon. A scan response packet is transmitted by the transmitting device when the receiving device transmits a scan response request data packet. The scan response data packet thus allows an additional thirty one (31) bytes to be sent from the beacon to the receivers while still in the non-connectable advertising mode.

However, a shortcoming of wireless beacon implementations is that they do not protect against unauthorized copying, alteration and use of the replicated beacon data ('spoofing'). The beacon advertising data can be replicated using a BLE scanning device and to copy the beacon parameters into another beacon's configuration. The replicated beacon can then be used to trigger location-based services and provide misleading position data to receivers. Since BLE operates in an unlicensed frequency band, there are no significant technological or legal barriers to creating a large number of unauthorized beacons by copying beacon values from known operating beacons and provide misleading position data to receivers. The problem is further exacerbated because highly integrated BLE transceiver devices are inexpensive, and are easily available. Thus, what is needed is techniques, methods, and/or systems that can securely authenticate the data packets transmitted by a BLE technology operable device while preserving the low bandwidth utilization of the BLE connectionless state (i.e., only advertising and scan response packets). Furthermore, such techniques, methods, and/or systems need to be able to detect (and prevent) the unauthorized replication of data between communication of BLE enabled transmitters and receivers.

SUMMARY OF THE DESCRIPTION

The innovative techniques described herein can provide protection of packet payload data against alteration and duplication in a manner which preserves the low communications overhead advantages of operating in a non-connected (unpaired) state. In one embodiment, a transmitting device and receiving device employ BLE technology based transceivers to at least transmit or receive data packets. In one embodiment, a BLE enabled transmitting device is configured to transmit a non-security data packet that includes a broadcast message. The broadcast message can, in one embodiment, include the transmitting device's identification data (e.g., the device's critical data like the device's universally unique identifier (UUID) or any other information that can act as an identifier to identify a device) and, optionally, any other information using which the receiving device can perform specific actions. A non-security data packet can be any data packet according to the BLE specification in the non-connected state which has a data payload without the authentication information, as described herein. The transmitting device is also configured to transmit a security data packet, including an authentication tag to the receiving device. The authentication tag is computed using at least a secret key known to both the transmitting device and a receiving device. A security data packet is any data packet in the non-connected state which includes the authentication information, as described herein.

Once the non-security and security data packet are received by the BLE enabled receiving device, it determines whether the secret key can be derived using the transmitting device identification data, and if so it derives the secret key that is used to compute an authentication value. The authentication value is then compared to the authentication tag transmitted earlier by the transmitting device. If the authentication value is matched with the authentication tag value then it is determined that the broadcast message is an authentic transmission, otherwise it is determined that the broadcast message is not an authentic transmission.

In another embodiment, when the secret key cannot be derived using the transmitting device identification data, the receiving device derives the secret key using an Authentication Key Identifier (AKI) provided within the security data packet. In yet another embodiment, the secret key can be derived using a combination of the transmitting device identification data and the AKI. In yet another embodiment, the receiving device can further compare a wide-area synchronized real-time clock value to a wide-area synchronized real-time clock value received from the transmitting device to determine whether the broadcast message has been subjected to unauthorized replication. The real-time clock value transmitted by the transmitting device can be provided in the security data packet or the non-security data packet. In another embodiment, the authentication tag described herein is a message authentication code that is further computed by the transmitting device using a message authentication algorithm.

In one embodiment, the security data packet is transmitted as a scan response data packet. In another embodiment, the security data packet is transmitted as a modified advertising data packet (that is, an advertising data packet with a modified payload), wherein the modified advertisement data packet is an advertising data packet that at least includes the authentication tag. In one embodiment, the modified advertising data packet and a conventional advertising data packet can be transmitted by the transmitting device in an alternating manner (that is, after each conventional advertising data packet, the transmitting device transmits a modified advertising data packet, or vice-versa). In one embodiment, the security data packet is transmitted by the transmitting device responsive to receiving a scan response request data packet from the receiving device. In another embodiment, the security data packet is transmitted by the transmitting device responsive to transmitting an advertising data packet to the receiving device. In one embodiment, the security data packet can be a scan response request data packet or a modified advertising data packet. In yet another embodiment, the non-security data packet is an advertising data packet. In one embodiment, the receiving device derives the secret key directly or indirectly from a lookup table. In another embodiment, the transmitting device further computes the authentication tag using a value that is received by the transmitting device from the receiving device. In this embodiment, the receiving device further computes the authentication value using the value transmitted to the transmitting device. Further, in another embodiment, the value can be determined from the Media Access Control (MAC) address field of the receiving device and is transmitted to the transmitting device by the receiving device using a scan response request data packet. In one embodiment, the value can be the MAC address, in another embodiment, the value can be derived using the MAC address. In yet another embodiment, the validation of the data received from the transmitting device, by the receiving device, is implemented using a client-server architecture with the receiving device acting as the client and the remote server performing the validation functions described herein.

BRIEF DESCRIPTION OF THE DRAWINGS

The present invention is illustrated by way of example and not limitation in the figures of the accompanying drawings in which like references indicate similar elements.

FIG. 12 describes a block diagram illustrating a computing/processing device that can be used in various embodiments of the present invention.

DETAILED DESCRIPTION

Figure 1:
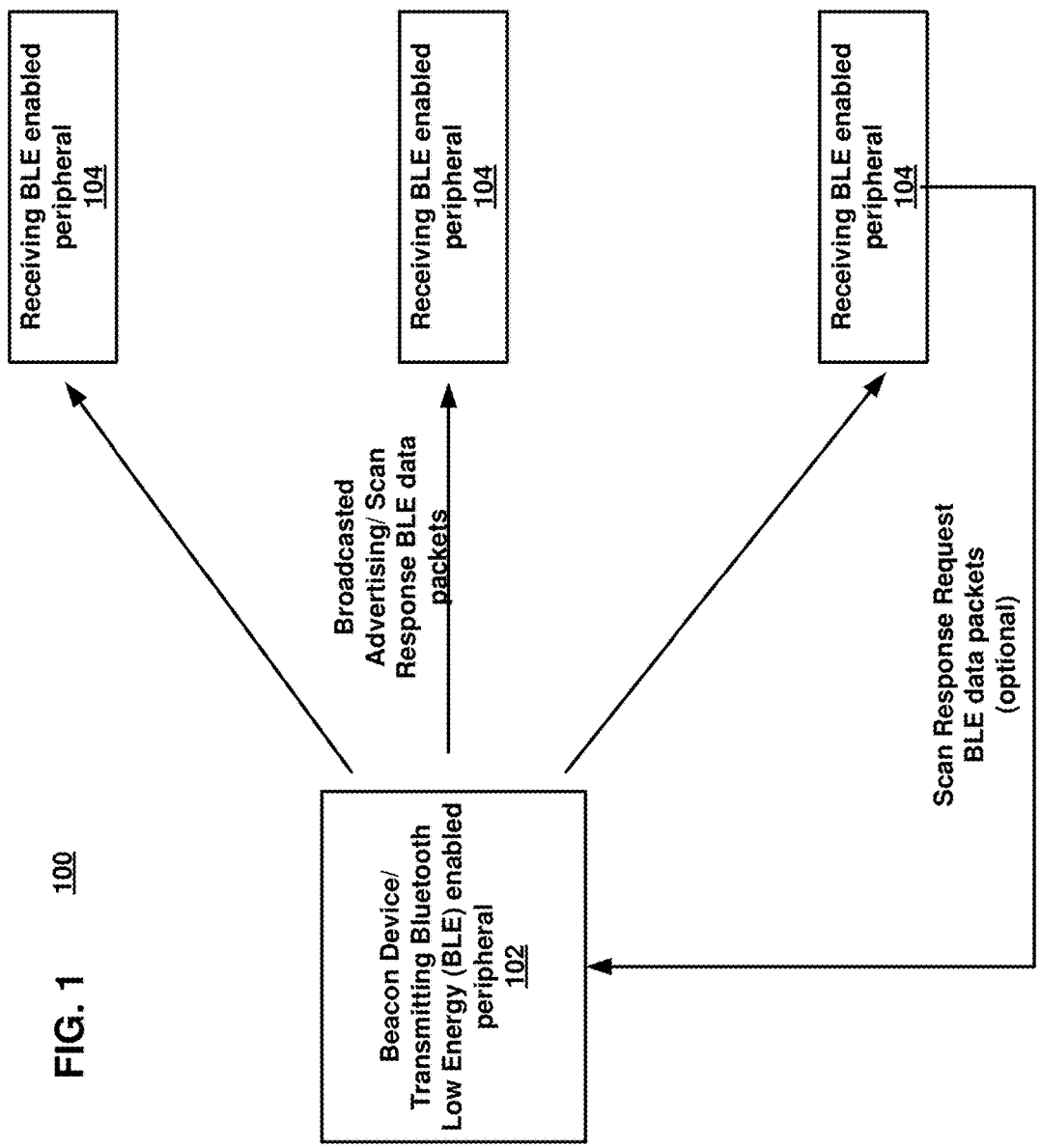
FIG. 1 illustrates a block diagram describing the interaction of a BLE enabled transmitting device and receiving devices, according to one embodiment of the present invention.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

According to one embodiment of the invention, authentication information can be included in the beacon's transmitted broadcast data in order to convey an authentication data field (tag) from the beacon to one or more receivers. As described herein, a data packet with such authentication information is referred to as a security data packet herein. Similarly, a data packet without the authentication information is referred to as a non-security data packet herein.

In one embodiment, in the security data packet, the authentication computation determines a tag whose value depends upon the critical beacon data (the transmitting device's identification data) fields and a secret key. The secret key is known to the beacon and the intended receivers but is otherwise maintained as confidential information within the beacon and intended receiving devices. The receivers compare the received authentication tag to a computed authentication value using the beacon data in order to determine if the received data fields are authentic. Further, in another embodiment, the techniques described herein can be implemented in a client-server model, where the receiving device acts as the client and the remote server performs the validation functions described herein. Generally, herein, unless stated otherwise, the term validation refers to determining if the information transmitted from the beacon/BLE transmitting device is authentic, and, optionally, further determining that the information was transmitted from a legitimate source.

In one embodiment, the authentication information/data described herein can be included in the Bluetooth Low Energy Profile (BLE) advertising packet or in the BLE scan response packets in order to convey an authentication tag from a BLE beacon to one or more BLE receivers. The general format of the advertising and scan response data packets is given by the Bluetooth Low Energy Specification. Since advertising and scan response data packets are not part of a connected state, according to the BLE specification, the techniques described herein augment the BLE technology by providing authentication between a BLE transmitter and a BLE receiver in a non-connected state.

In one embodiment, the authentication tag or digest comprises a plurality of bits. The authentication tag can be computed in the beacon (or any BLE enabled peripheral) using a message authentication algorithm. In one embodiment, the message authentication algorithm can be computed over a subset of the transmitted beacon data. Generally, such a subset can include any beacon data which is considered important to authenticate by the system designer. In one embodiment, this can include critical header configuration information describing parsing and security parameters, the beacon/BLE peripheral UUID, major and minor numbers, and transmitter power calibration information. It should be noted, the UUID, major and minor numbers, and transmitter power calibration information are for illustrative purposes only, and can be replaced by any equivalent field(s) that can include beacon/device data to uniquely identify a BLE enabled peripheral/beacon in a distributed network. Thus, in another embodiment, the transmitted beacon data can include other known identifiers to a person of ordinary skill in the art (e.g., namespace and/or instance id), to identify the BLE enabled peripheral/beacon. In another embodiment, the computation of the authentication tag can include a time-varying value, as described further herein.

Exemplary message authentication algorithms can include, but are not limited to, HMAC MD-5, HMAC SHA-1, HMAC SHA-2 or other hash-based algorithms known to a person of ordinary skill in the art. In one embodiment, the hash computation is calculated over the data fields to be authenticated using a secret key. However, the innovative subject matter described herein is not limited to hash based algorithms. Other message authentication code algorithms (e.g., CBC-MAC and AES-CCM) known to a person of ordinary skill in the art (which make use of encryption on the values of the critical data instead of hashing to generate the authentication tag) can also be implemented in any embodiment.

In one embodiment, the message authentication algorithm can satisfy the constraint that the computed tag is not predictable (or hard to predict) without knowing the value of the secret key. In another embodiment, the secret key can be derived from a mutually shared secret. The secret key is known to the transmitting beacon and to the receiving devices but is otherwise considered as confidential information. In one embodiment, the message authentication code algorithms may require a significant number of bits to represent the authentication tag. For example, a full SHA-2 algorithm authentication digest requires two hundred twenty four (224) or more bits. In some circumstances, the authentication tag length exceeds the permissible data packet size. Thus, in one embodiment, the authentication field can be computed and then truncated to fit into a single advertising or scan response packet, or split across multiple advertising or scan response packets. When the authentication field is truncated, in one embodiment, the corresponding comparison is the limited to the same tag length in the receiver. When, in another embodiment, the authentication tag is split across multiple advertising or scan response packets, the reception of multiple packets can be required before it is possible to determine beacon data authenticity.

In one embodiment, in order to determine if a received secure advertising data packet is authentic, the received data authentication tag is compared to an authentication value computed in the receiving device from the received critical data fields, not including the received authentication tag itself. The received tag is then compared to the computed authentication value on a bit-for-bit basis in order to determine if the received packet is authentic. The received and computed fields will match with a very high probability when the receiving device uses the same secret key in the computation and if the protected data fields are received without error.

In order to compute the authentication value needed for the comparison with the received authentication tag, the receiving device needs to know the secret key for the corresponding beacon. In one embodiment, the key can be determined from implicit or explicit information in the advertising or scan response packets. Implicit determination can be used where there is only one key or when the key can be determined from the context of the beacon's transmitted data. For example, in certain embodiments, the UUID field in the beacon's critical data can be used in a lookup-table in the receiving device order to determine the corresponding secret key to use in the computation. In another embodiment, a key identifier can also be included in the advertising or scan response data packets directly. In such an embodiment, a data field in the advertising or scan response packets is used to derive a lookup table index. In one embodiment, there can be a one-to-one correspondence between the index value and the true key.

In another embodiment, it is not desirable to use the shared secret key directly in order to perform the authentication algorithm. Instead, a secondary key is used which can be derived from the shared secret (master) key using additional information, for example, a random seed. The advantage of this implementation is that it limits exposure of the master key information in the event the authentication fields are successfully reverse-engineered. For example, if the secondary key is related to the master key by a non-reversible hash, a breach of the authentication due to exposure of the secondary key may not compromise the master key information. In an embodiment, the secondary key can be derived from the master key using additional transmitted fields, such as a random seed, or the conventional BLE data format fields (the UUID, major, and/or minor data fields). In one embodiment, the master key has a one-to-one correspondence with the UUID data field, and the secondary key is derived from a hash of the UUID and the major and minor data fields of the BLE data format.

Further the transmitted fields are, in general, mostly static for a specific BLE peripheral/beacon. According to various embodiments of the invention, the resulting transmitted packet cab be considered secure since receivers can determine if the transmitted authentication tag matches the corresponding computed authentication tag over the critical data fields. This implementation prevents the accidental or intentional alteration of transmitted beacon information. However, this implementation does not protect against spoofing or cloning of a secure beacon. For example, the complete advertising or scan response data fields can be queried from a secure BLE beacon by any compatible BLE receiving device. These data fields can be then programmed into another beacon, effectively becoming a clone beacon, without knowledge of the secret key. The clone beacon's data may be not altered because this would require updating the required authentication tag, which cannot be computed without knowledge of the secret key. However, receivers may still determine that the clone beacon's data is authentic.

Thus, the innovative techniques described herein can further also provide protection of packet payload data against alteration and duplication in a manner which preserves the low communications overhead advantages of operating in the connectionless state. According to at least another embodiment of the invention, to further protect receivers against the effects of unauthorized beacon data replication, additional information in advertising or scan data response packets is transmitted by the beacon/BLE enabled peripheral device. In one embodiment, it is preferred to include substantially non-repetitive, time varying data in the data fields included in the authentication tag computation in order to protect against receiving information from beacons transmitting data which may have been duplicated by observing other secure beacon's transmitted data. For example, an increasing counter, a counter corresponding to a real-time clock, or a combination thereof, can be used to substantially include non-repetitive, time varying data. The non-repeating data is included in the computation of the data authentication tag in the beacon/BLE enabled peripheral, so that the determined tag varies from one packet to the next even when the remaining beacon data fields are static. While a clone of a single instance of a secure beacon's data fields may be produced without knowledge of the secret key, according to an embodiment, the beacon clone's authentication tag value will correspond to only one instance of the non-repeating value.

When the non-repeating value is an incrementing counter, receivers can be configured to determine if the received beacon/BLE enabled peripheral data is likely to have been replicated by receiving multiple advertising or scan response packets, depending on how the beacon/BLE enabled peripheral authentication is implemented. If the clone beacon/BLE enabled peripheral data corresponds to only a single captured instance of a secure beacon/BLE enabled peripheral's data, the received data packets will not exhibit a change in counter value from one received authenticated advertising or scan response packet to the next, and the receiver can, thus, determine that the received packets are likely to have been duplicated. However, a counter does not provide the receiving device the ability to determine the expected beacon's counter value when it is not within range of the beacon's RF signal.

Therefore, in an alternative embodiment, in order to prevent creating create clone beacons by observing multiple transmitted data packets with authentication tags from a secure beacon/BLE enabled peripheral and reproducing a sequence of corresponding packets in the clone beacon/BLE enabled peripheral, a real-time clock can be used. According to an embodiment, the use of a counter which corresponds to a real-time clock or an offset to a predetermined real-time clock value, can be implemented for the non-repeating data value field. In one embodiment, the offset technique can be preferred to maximize the number of counter cycles before overflow of the data field. For example, the real-time clock may be the number of seconds since a pre-defined calendar date (e.g., Jan. 1, 2014). In this embodiment, the counter can be initialized to the proper value when the beacon/BLE enabled peripheral's data fields are configured. In one embodiment, the real-time clock value can be maintained through battery backup or other constant power source which may be independent of the beacon's power source. In another embodiment, the BLE enabled receiving device (e.g., a Smartphone, tablet computer, handheld/portable computing device, or any other BLE enabled computing device), can include a corresponding real-time clock source. The receiving device can compare the real-time clock value received from the beacon/BLE enabled peripheral to its own real-time clock value and, in one embodiment, only allow actions when the authentication data is genuine (i.e., matching transmitted and computed authentication tags) and when the beacon/BLE enabled peripheral's real-time clock values and receiver's real-time clock values are sufficiently close to one another. In embodiments where the beacon/BLE enabled peripheral and receiver real-time clock cannot be implemented with the same clock reference or real-time clock resolution, the effective values can be normalized to a common timescale before comparison.

In general, the clock sources between the beacon/BLE enabled peripheral and the receivers are not synchronized, so some amount of permissible drift is necessary in determining acceptable difference between the beacon and receiver real-time clock values. The acceptable difference amount depends upon the required security of the system application and the expected tolerances in the beacon and receiving devices' real-time clock implementations. Typical real-time clock implementations may be accurate to within a few minutes per year. Accordingly, in one embodiment, the beacon's/BLE enabled peripheral's real-time clock value can be recalibrated with an external source at certain intervals to improve long-term accuracy. In another embodiment, when the capacity of the real-time clock value field is exhausted or if the real-time clock value is compromised due loss of a power source, the beacon/BLE enabled peripheral can indicate a compromised value in some other data field or with a sentinel value of the real-time clock so that the beacon's/BLE enabled peripheral's data can be easily determined as insecure by a receiving device.

Certain embodiments that support wide area synchronization can solve the problem of how to compare non-repeating values between the beacon/BLE enabled peripheral and receiving devices. In such embodiments, the real-time clock value provides a non-repeating value which supports approximate wide area synchronization. In such embodiments, the real-time clock value(s) can be derived from known external system timing sources that provide wide area synchronization, such as (but not limited to) GPS, eLORAN, FM SCA (e.g. RBDS) timing sources, network timing sources, other radio-frequency beacons, or a combination thereof. In certain embodiments an real-time clock is implemented with an always-on crystal oscillator. In such embodiments, the real-time clock has no independent wide-area reference and can be calibrated using an external time source reference, at which point it becomes free-running. In other embodiments having an always-on oscillator and independent wide-area reference, the real-time clock oscillator can be periodically (e.g., daily, weekly, monthly, etc.) calibrated using the wide-area reference.

In applications which use location information in order to determine further actions, it is generally more important to determine if the data is authentic than to protect the confidentiality of the data. In other words, authentication of the beacon's critical data in the advertising packets is generally more important than encryption (hiding) of the data. However, in certain embodiments, the data may be encrypted with the exception of those fields that are necessary to determine the shared key and to provide for proper packet parsing.

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

For illustrative purposes only, the techniques described herein are implemented for applications using BLE based beacons. However, a person of ordinary skill in the art would appreciate that the innovative subject matter disclosed herein can be used for securing arbitrary broadcast data payloads in any BLE connectionless (i.e., advertising and scan response) inter-device communication.

FIG. 1 illustrates a block diagram 100 describing the interaction of a BLE enabled transmitting device and receiving device(s), according to one embodiment of the present invention. As shown BLE enabled beacon 102 can broadcast data packets to BLE enabled receiving devices 104. A beacon can broadcast advertising data packets or scan response data packets. The scan response data packets are responsive to a scan response request data packet that can be transmitted by the receiving devices 104. In one embodiment, the authentication information is transmitted by the beacon in an advertising data packet to the receiving device 104. The advertising data packet can also comprise the broadcasted data message intended for the receiving device, based on which the receiving device can perform specific actions. In another embodiment, the advertising packet comprises the authentication information, without the intended broadcast message. In such an embodiment, the advertising data packet is transmitted separately. In yet another the authentication information can be transmitted in a scan response data packet. A scan response data packet is responsive to a scan response request data packet.

Generally, a data packet comprising authentication information required to determine if a broadcast message transmitted by a BLE enabled transmitting device is secure is referred to as a security data packet herein. Further, a data packet comprising information according to the BLE specification, without the authentication information as described herein, is referred to as a non-security data packet herein. Therefore, any data packet according to the BLE specification in the unconnected state (e.g., advertising data packet, scan response data packet, scan response request data packet, etc.), can each be considered as a security data packet or a non-security data packet, depending on whether the data packet comprises the information required to authenticate the transmitting device's data, as described herein. Further, an advertising data packet comprising the information to authenticate a broadcasted message (but without the broadcast message intended for the receiving device) is referred to as a modified advertising data packet herein. As described herein, a broadcast message is the information transmitted by the transmitting device using which the receiving device performs specific actions (e.g., visit an advertisers webpage, provide the user additional information depending on the user's location, display information, and/or execute commands, as required). In one embodiment, where the receiving device can perform certain actions using the transmitting device's identification data, the broadcast message can be limited to such identification data. In another embodiment, where the receiving device can perform certain actions using additional information, the broadcast message can include the transmitting device's identification data as well as the additional information, as necessary.

Figure 2:
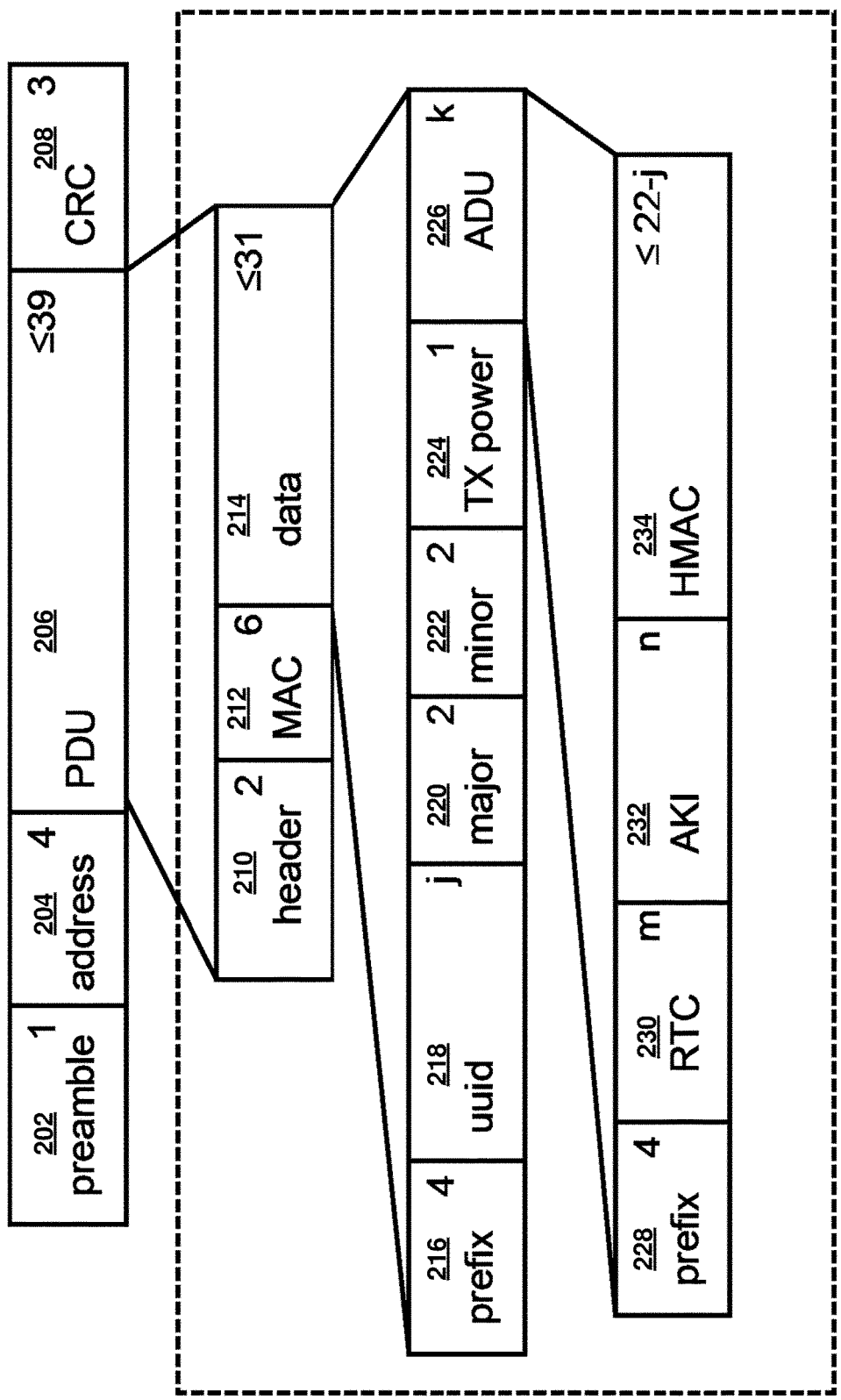
FIG. 2 illustrates a diagram describing the format of a data packet, according to one embodiment of the present invention, with the authentication information included in a BLE advertising packet with the intended broadcast message for the receiving device.

FIG. 2 illustrates a diagram 200 describing the format of a data packet, according to one embodiment of the present invention, with the authentication information included in a BLE advertising packet with the intended broadcast message for the receiving device. As illustrated, according to the BLE specification, an advertising data packet comprises a one byte preamble field 202, a four byte address field 204, an up to thirty-nine byte PDU 206 field, and a three byte CRC field. PDU 206 further comprises a two byte header field 201, a six byte media access control (MAC) address field 212 that provides the transmitting device's device address (public or random) and an up to thirty one byte advertising payload data packet 214. According to one embodiment, advertising payload data packet 214 can further comprise a four byte prefix 216 that defines the length of the payload length field 214, a universally unique identifier (UUID) 218 whose length is determined by the system designer (referred to as having a j byte field size). Further, in addition to a two byte major field 220, two byte minor field 222, and one byte representation of the BLE device's transmit power 224, according to one embodiment, an additional authentication data unit (ADU) field 226 whose length is also determined by the system designer (represented herein as of size k bytes) is provided.

In one embodiment prefix field data 216, major field data 220, minor field data 222 and transmission power field data 224 are considered as the critical beacon data that is static for a specific beacon but varies somewhat from one beacon to another beacon. In one embodiment, ADU 226 comprises the authentication information required to determine if a payload data (broadcast message) is authentic. In one embodiment, ADU 226 comprises other data fields, which include the ADU prefix 228, a time-varying value 230 (also referred to as RTC herein) which may be but is not limited to being a real-time clock value (e.g. real-time clock, counter, random value or any value that can vary with time), an authentication key identifier (AKI) 232, and a message authentication code tag 234, abbreviated as HMAC. It should be noted that the time varying field value 230 is referred to as RTC for illustrative purposes only. In one embodiment HMAC 234 is implemented using a hash-type message authentication algorithm. In yet another embodiment, HMAC 234 need not be restricted to being implemented with a hash-type message authentication algorithm. In general, the number of bits required for each of the fields of the ADU depends upon the specific system implementation. The ordering of the fields as described herein is for illustrative purposes only and can be arbitrarily defined with respect to each other and/or with respect to the beacon data. In one embodiment, an ordering can be used which simplifies the parsing of the data in the receiver and which maximizes compatibility with conventional beacon implementations. The computation of the message authentication code tag 234 in the beacon includes all of the critical beacon data fields and certain ADU 226 fields, especially the RTC field 230 value, when present. In certain implementations, the fields prefix 228, RTC field 230, or AKI 232 may be optional. However, authentication tag 234 is required for all embodiments of the invention.

In one embodiment, ADU prefix 228 is a plurality of bits that is used to facilitate parsing of the remaining data fields within ADU 226 in the receiving device by specifying the type of message authentication code algorithm used, the number of possibly truncated bits of the computed tag which are present, and other parameters of the authentication. When all of the characteristics can be predetermined by other means, ADU 226 can be omitted altogether but this limits the overall system flexibility. In one embodiment, parts of ADU prefix 228 field may be required to comply with the BLE specification for the formatting of manufacturer specific data when the ADU field is the first element of the advertising data payload. The recommended minimum number of bits for the ADU prefix 228, when implemented, is four (4) bytes when it needs to include the manufacturer specific data header, otherwise two (2) bytes, according to one embodiment.

In one embodiment, the purpose of the time-varying field 230, typically either a real-time clock or counter value is to include a value in HMAC 234 calculation which varies from one transmitted packet to the next, so that the computed message authentication tags change for each transmitted packet, even when the remaining parts of the advertising data packet are static. The field is optional, but if it is not present, the receiver would have no mechanism to determine whether the packet has been duplicated. Thus, without time-varying field 230, the advertising packet may still be secure because it includes the message authentication code computed over the critical beacon information, but the packet contents may be replicated into another beacon device without detection. Therefore the RTC field value 230 can assist the receiver in determining whether the transmitted data was subjected to unauthorized replication. The minimum recommended length for the RTC value 230, when implemented, is about four (4) bytes, according to one embodiment.

In one embodiment, the time-varying field 230 comprises a counter value, which is incremented in the beacon for each transmitted advertising packet. The advantage of this implementation is its simplicity, and this approach may provide sufficient security in certain applications. However, the receiver, in general, will not receive all transmitted advertising packets, for example, when the receiver is not within RF range of the beacon device. As a result, the receiving device cannot know with certainty that the received counter value had not been previously transmitted. Thus, it would be possible to observe authenticated packets from a secure beacon, without disturbing the secure beacon, and reproduce this packet pattern in another beacon without detection by a receiver. Instead of a counter, a cryptographically random number generator may be used to implement the time-varying field, but this approach still does not prevent replication of packets through sufficient observation of values.

To address the above mentioned shortcoming, in one embodiment, a value for the time-varying field which facilitates approximate wide-area synchronization between the beacon and the receivers can be used. An example of this is a real-time clock value in time-varying field 230. The beacon and receiver both require a real-time clock in order to make a comparison between transmitted and received values. In one embodiment, in the beacon, the real-time clock can be implemented with a crystal oscillator. The crystal oscillator is a free-running cycle counter. However, unlike the simple counter based techniques described above, the cycle count is relative to a known reference time. The association with the known reference time is established when the beacon device is calibrated during installation or periodic maintenance. For the receiving device, the real-time clock functionality is often already present in the device for other purposes, for example, the real-time clock included in a typical Smartphone implementation. Thus, it is possible to make direct comparisons with the received beacon real-time clock value and the receiving device's own real-time clock value even though the receiving device may not have received all of the beacon's advertising packets. Since the real-time clock values in the beacon and receiving devices are not likely to be synchronous, in one embodiment, the comparison of real-time clock values must accommodate the uncertainty in implementations and calibrations of the real-time clock value generators. In such an embodiment, the comparison must provide for a difference in values to accommodate the potential differences in the transmitted real-time clock value in data field 230 and the receiver's own real-time clock value due to system implementation of the clocks. When the difference is less than a predetermined threshold value, the clock values should be considered as sufficiently close to permit packet acceptance, as described subsequently in FIG. 9. This uncertainly should be limited to a value small enough so that it would be very difficult to implement a clone beacon. Note that the real-time clock technique does not strictly prevent clone beacon implementation completely if near synchronous duplication is possible, but it does make it significantly more difficult to accomplish reproducing authenticated packets than when a simple counter based technique is implemented. To achieve higher levels of security, it is important to achieve a greater degree of synchronization between the real-time clock time sources in the beacon and receiving devices so that a smaller maximum time difference may be used. A further technique to increase security is possible with the scan response request embodiment of the invention, as described when referencing to FIG. 4 herein.

The AKI data field 232 is a plurality of bits which together represent a value that the receiving device can make use of in order to determine the mutually shared secret key. The field is optional. In order to properly determine the computed message authentication value for comparison with the transmitted authentication tag in HMAC field 234, the receiver must know the corresponding secret key that was used in the computation of the authentication code in the transmitting beacon. When the key cannot be determined from other beacon context information, for example, the UUID, major, and minor fields, the AKI field value can be used. In one embodiment the AKI field value is use as a look-up table index in order to determine the corresponding key. If the key value can be determined solely from the other received data, the AKI field may be omitted. The key value itself is not transmitted. The transmitted value, either through context or by the explicit AKI field, is an indirect representation of the key value, for example, a lookup table index. There should be a one-to-one correspondence between the AKI value and the true secret key value. The recommended minimum length for the AKI field 232, when implemented, is four (4) bytes, according to one embodiment.

An important data field in the ADU 226 is the message authentication code tag (HMAC) 234. The code tag is a plurality of bits that corresponds to the value of the digest computed by the message authentication code implemented in the beacon. The computed digest may be truncated to a lesser number of bits than what are required to represent the algorithm's full digest length. The digest is computed over the beacon's critical data fields and certain parts of the ADU 226 using a secure key, which is known to both the beacon and the receiver. In a preferred embodiment, the message authentication digest calculation should include all critical beacon identifying data (e.g., UUID, major, minor, TX power) and the time-varying RTC 230 value, when present. The calculation can also include the ADU prefix 228 and AKI 232. In certain implementations, a secure key hash digest algorithm is used, for example, HMAC MD-5, or HMAC SHA-1 HMAC SHA-2, or any other hash based algorithm known to a person of ordinary skill in the art. It should be noted that it is not a requirement of the invention that a hash-based message authentication code be implemented. Message authentication codes which use encryption to determine the digest, such as CBC-MAC, can be implemented, according to one embodiment. In general, hash algorithms are faster to compute than encryption-based algorithm. However, this is not always the case, especially if hardware acceleration for encryption is available. For example, in the connected state, the BLE specification specifies the use of encryption using the AES-CCM algorithm. As a result, many BLE devices already implement AES encryption with dedicated hardware acceleration. On such devices, it may be preferable to implement a AES-based message authentication algorithm, such as AES-CCM in authentication mode, instead of a hash-based algorithm, when used in a non-connected state, as described herein. For AES-CCM, the encrypted message integrity check (MIC) bits are used for the message authentication tag. The recommended minimum length for the message authentication code tag 234 is four (4) or more bytes, according to one embodiment.

When ADU 226 is included as supplemental information in a beacon's advertising packet, there may be insufficient bits available within the data payload to permit a reasonable implementation of the invention. For example, if the beacon fields consume 25 of the available 31 bytes in the advertising packet payload then the intended broadcast message can at most have a size of 6 bytes. In certain circumstances, parts of the critical beacon data fields can be repurposed to contain authentication information, for example, using parts of the UUID field, or the advertising packet MAC field. For example, it can be possible to use parts of the MAC field to convey the RTC 230 value and/or HMAC field.

In one embodiment, the critical beacon data, at least in part, can be the beacon/device identification data that is transmitted by the beacon to the receiving device, using which the receiving device computes an authentication value. Similarly, the beacon can use the critical beacon data, at least in part, to compute the authentication tag (HMAC) 234 prior to transmitting the authentication information to the receiving device. The received beacon data fields together with received RF signal characteristics provide the receiver with sufficient information in order to determine its coarse proximity with respect to the known beacon, for example, in-range or out-of-range, and it may provide sufficient information to determine an approximate distance between the receiver and the beacon if the beacon transmitter power and receiver received power are accurately known. The beacon identifier information together with the determined location information facilitates the receiving device, typically a mobile phone or tablet, performing location-specific actions. The actions may be triggered by a change in proximity, for example, coming into range of a beacon or going out of range of a beacon, or by a change in position with respect to a beacon.

Figure 3:
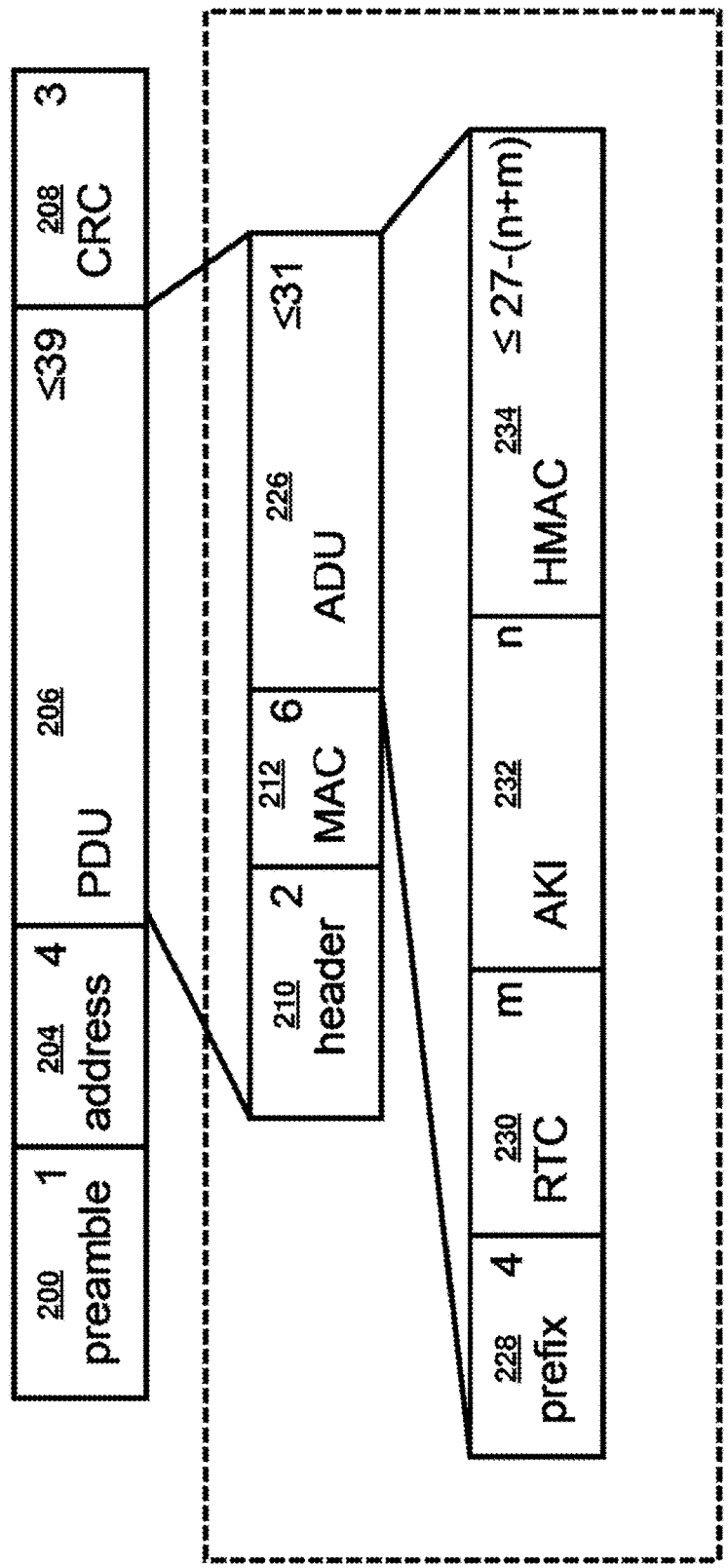
FIG. 3 illustrates a diagram describing a modified payload of a BLE advertising data packet with the authentication information without the intended broadcast message for the receiving device, according to one embodiment of the present invention.

FIG. 3 illustrates a diagram 300 describing a modified payload of a BLE advertising data packet comprising the authentication information without the intended broadcast message for the receiving device (modified advertising packet), according to one embodiment of the present invention. Thus, a modified advertising data packet is an advertising data packet that at least includes the authentication tag as its payload. As shown, authentication information can be transmitted in its own BLE advertising packet. The purpose of the fields within the ADU is the same as in FIG. 2 herein. In certain embodiments, the ADU prefix 216 for this implementation can be included in the manufacturer specific data header since the authentication header is not provided by conventional/known implementations of critical beacon data. Since this packet does not include the beacon critical information, the beacon critical information packet (regular advertising packet) and the authentication packet should be transmitted in alternating intervals (that is, each modified advertising packet is transmitted before/after each regular advertising data packet) so that receivers may receive both the critical beacon information (non-security data packet) and the authentication information (security data packet) without significant delays (but not at the same time). For example, transmission of a conventional beacon advertising packet may be followed by an authentication advertising packet, and then a beacon advertising packet, and so on.

Figure 4:
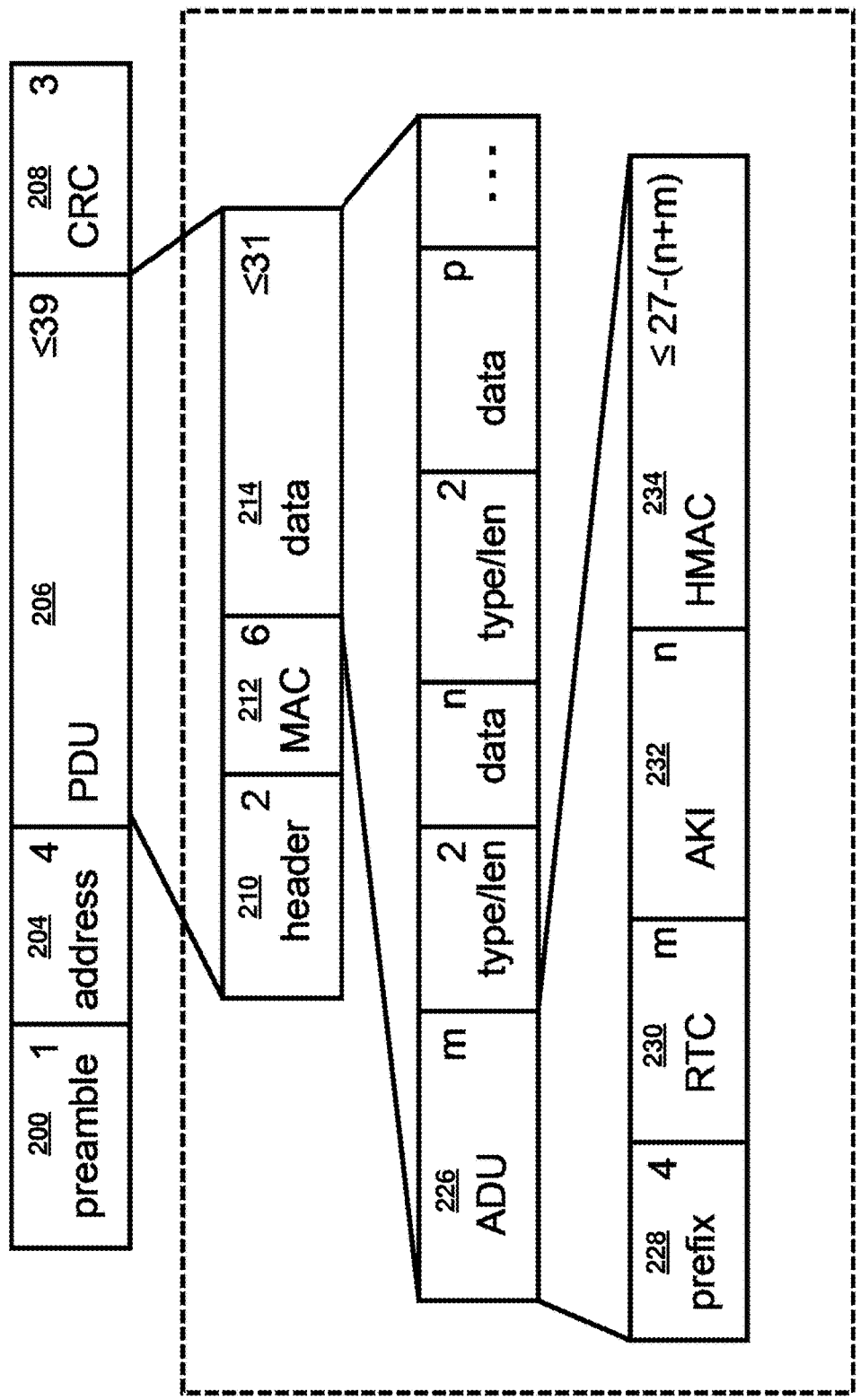
FIG. 4 illustrates a diagram describing the format of a BLE scan response data packet with authentication information, according to one embodiment of the present invention.

FIG. 4 illustrates a diagram 400 describing the format of a BLE scan response data packet with authentication information, according to one embodiment of the present invention. If a BLE receiver device operates in a BLE passive scanning mode, the BLE advertising device, in this case, the beacon, may not know if there are receiver devices within range, and a scan response data packet cannot be generated by the BLE advertiser. However, if the receiver device operates in a BLE active scanning mode, it may generate a scan response request to a BLE advertising/transmitting device when it receives an advertising packet. The BLE advertising/transmitting device can then transmit another data packet to the receiver device. This data packet is called the scan response data packet in the BLE system specification. As shown PDU field 206 can comprise header field 210, media access control (MAC) address field 212, and data field 214. Data field 214 can further comprise ADU field 226; ADU field comprising ADU prefix field 228, RTC field 230, AKI field 232, and HMAC field 234. According to one embodiment, the scan response data packet transmitted by the beacon can include the authentication data unit ADU 226.

Although, this implementation requires additional BLE packets (the scan response request packet and scan response packets) to be exchanged between the beacon and the receiving devices (rather than the beacon simply transmitting the advertising packet(s)), there are advantages using this implementation. An advantage of this implementation is that known beacon implementations do not make use of the scan response data packet, so its payload region is not predefined. As a result, there are ample bytes available for a system implementation of the ADU with a high degree of flexibility and security. ADU prefix 228 for this implementation should include the manufacturer specific data header in order to comply with the BLE Generic Access Profile (GAP) specification. A further advantage of implementing the authentication information in the BLE scan response data packet according to the invention is that it may conserve the beacon power, which is important when the beacon is not operated from mains power. When the authentication information is included in the advertising data packets, it is always sent, even when there are no receivers to receive the signal. In general, determining the authentication information may require a complex mathematical calculation. By placing the authentication information in the scan response data, the beacon can compute the authentication information only when a scan response is requested by a receiving device. Thus, if there are no receivers requesting a scan response, no authentication calculation is needed in the beacon.

Another advantage of the scan response implementation of the invention is that the strength of the countermeasures against packet replication can be greater than the other embodiments. For example, when the receiver causes the BLE advertising device to generate a scan response data packet by transmitting a scan response request to the BLE advertising device, the receiver's transmitted scan response request data packet includes a fixed or random address data in the MAC address field according to the BLE specification. For the scan response request packet, this field represents the receiver device's address. This field can be used advantageously in the message authentication code calculation in the beacon as part of the authenticated beacon data. In other words, the message authentication code tag, determined in the beacon, can include the beacon's critical data, the various components of the ADU, described previously, and the receiver's MAC address field value, further securing the authentication tag. Such an implementation is not possible when the authentication information is in the advertising data packet because the beacon is unaware of the receiver's MAC field value. Note that the MAC value used in the message authentication calculation is not the beacon's own MAC field value 212, which corresponds to the beacon's own device address.

In one embodiment, the receiver's MAC field value itself is not part of the beacon's transmitted scan response packet. The MAC field value 212 in the transmitted scan response packet must instead correspond to the beacon device, just as in the advertising packet. But the receiving device knows its own MAC field value, and so can use its own value in the determination of the authentication tag for comparison with the tag transmitted by the beacon. By varying the MAC field value used in the receiver's generated scan response request from one packet to the next, the receiver can, in one embodiment, determine if the resulting scan response packet received from the beacon includes an authentication tag that changes correspondingly. Since the receiver's MAC field value is not, in general, predictable a priori, it would not be possible for a beacon with replicated data to generate the correct authentication tag value without knowledge of the secret key. Thus, by utilizing the receiver's MAC field value in the message authentication calculation, the probability of a receiver receiving authenticated data from a cloned beacon is greatly reduced. When this technique is implemented and when the receiver's MAC address field can be made cryptographically random, the importance of the time-varying field in the ADU 230 is significantly diminished, and it can be omitted in certain embodiments.

Figure 5:
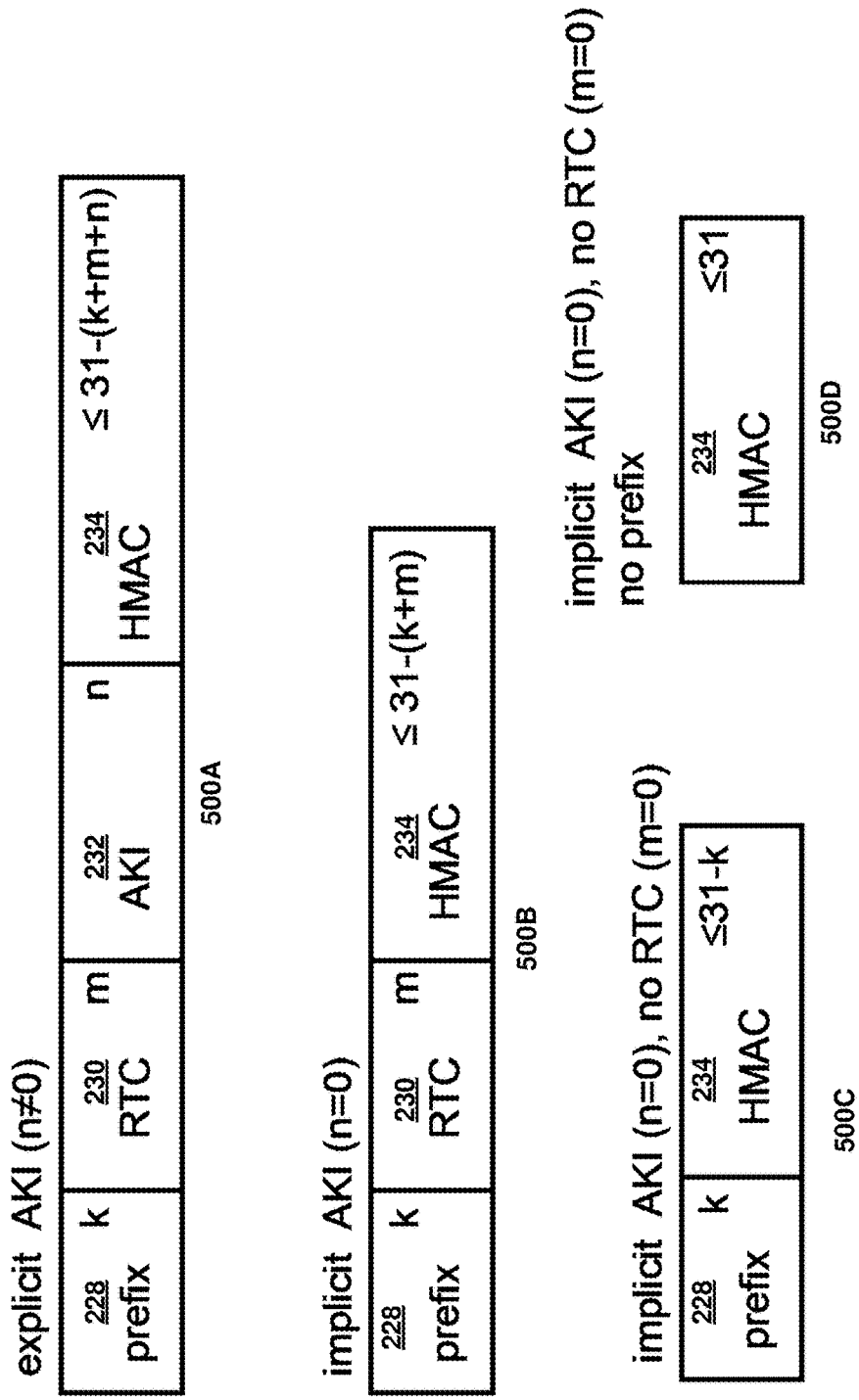
FIG. 5 illustrates a diagram describing the format of the authentication information with various optional fields, such as implicit or explicit key identifiers, according to one embodiment of the present invention.

FIG. 5 illustrates a diagram 500 describing the format of the authentication information with various optional fields, such as implicit or explicit key identifiers, according to one embodiment of the present invention. As described above, not all of the fields in the authentication data unit ADU 226 are required when implementing the techniques described herein. Block diagram 500A illustrates an exemplary ADU field 226. In certain embodiments, the ADU prefix field 228, the RTC field 230 value, or the AKI field 232 can each be optional. However, the HMAC authentication field 234 is a required part of ADU 226. In one embodiment, the AKI field 232 can be omitted, as shown in block diagram 500B, when there is sufficient context in the received beacon data in order for the receiver to determine what master key value was used to generate the required HMAC field 234. For example, the UUID field of the beacon critical data may be sufficient to determine the master key in the receiver through a lookup table. If the RTC field value 230 is omitted, as illustrated in block diagram 500C, the packet remains secure in that the receiver may detect that changes have been made to the protected data, but the beacon data may be replicated and generated on another beacon without detection. Further, as shown in block 500D, the ADU prefix field 228 can also be omitted when it is not required to achieve format compliance according to the BLE specification and when the authentication parameters can be otherwise determined, for example, either the parameters are fixed for all implementations, or if the parameters can be determined from other parts of the received beacon data. The data field variations shown in FIG. 5 correspond to the use the entire advertising packet's payload, which is up to thirty one (31) data bytes, for the ADU. If other fields are present in the packet, the available size for the ADU is reduced accordingly.

Figure 6:
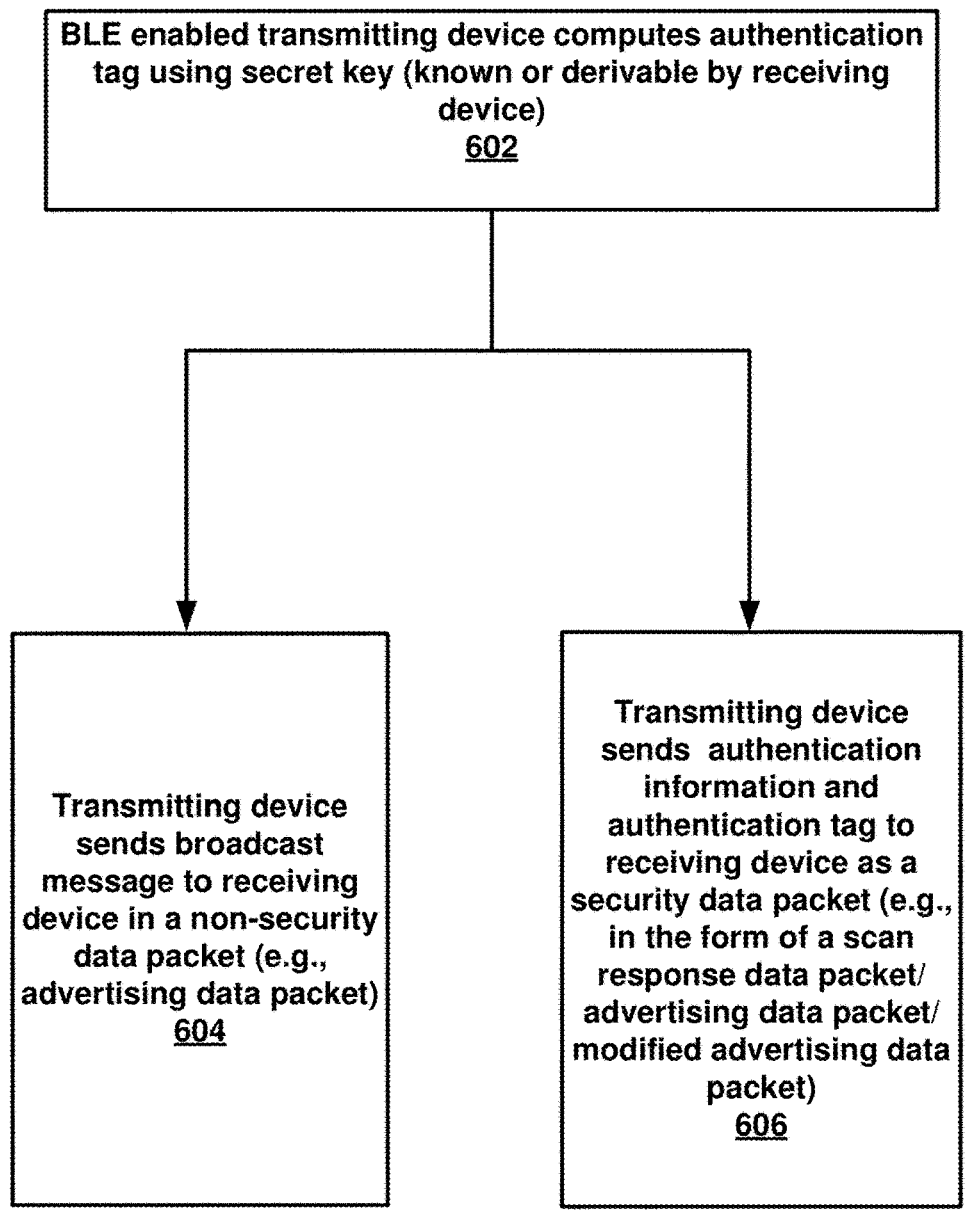
FIG. 6 illustrates a flowchart describing the operations of a transmitting device, according to one embodiment of the present invention.

FIG. 6 illustrates a flowchart 600 describing the operations of a transmitting device, according to one embodiment of the present invention. As illustrated at block 602 the BLE enabled transmitting device computes an authentication tag using a secret key that is known to the receiving device or by the remote server (in case of a client-server implementation). Optionally, in another embodiment, the authentication tag can further be computed by the transmitting device/beacon using any information transmitted from the receiving device in a scan response request data packet (e.g., a value known to the receiver, the receiver's MAC address, etc.). At 604, the transmitting device sends the broadcast message, including, at least a part of the critical device/beacon information (e.g., prefix 216, UUID 218, major 220, minor 222, and/or tx power 224) to the receiving device (as a non-security data packet). The non-security data packet can be an advertising data packet or a scan response data packet. Optionally, in embodiments that use the RTC field 230, a time-varying value can be transmitted in the non-security data packet. At 606, the transmitting device/beacon transmits at least part of the authentication information in ADU 226 that is required to compute the authentication value by the receiver as a security data packet (in the form of an advertising data packet, a modified advertising packet, or a scan response data packet, as described above herein). Additionally, the transmitting device/beacon also transmits the authentication tag to the receiver, and if an RTC field 230 value is used, that value can also be transmitted as part of ADU 226, if not transmitted in the non-security data packet.

Figure 7:
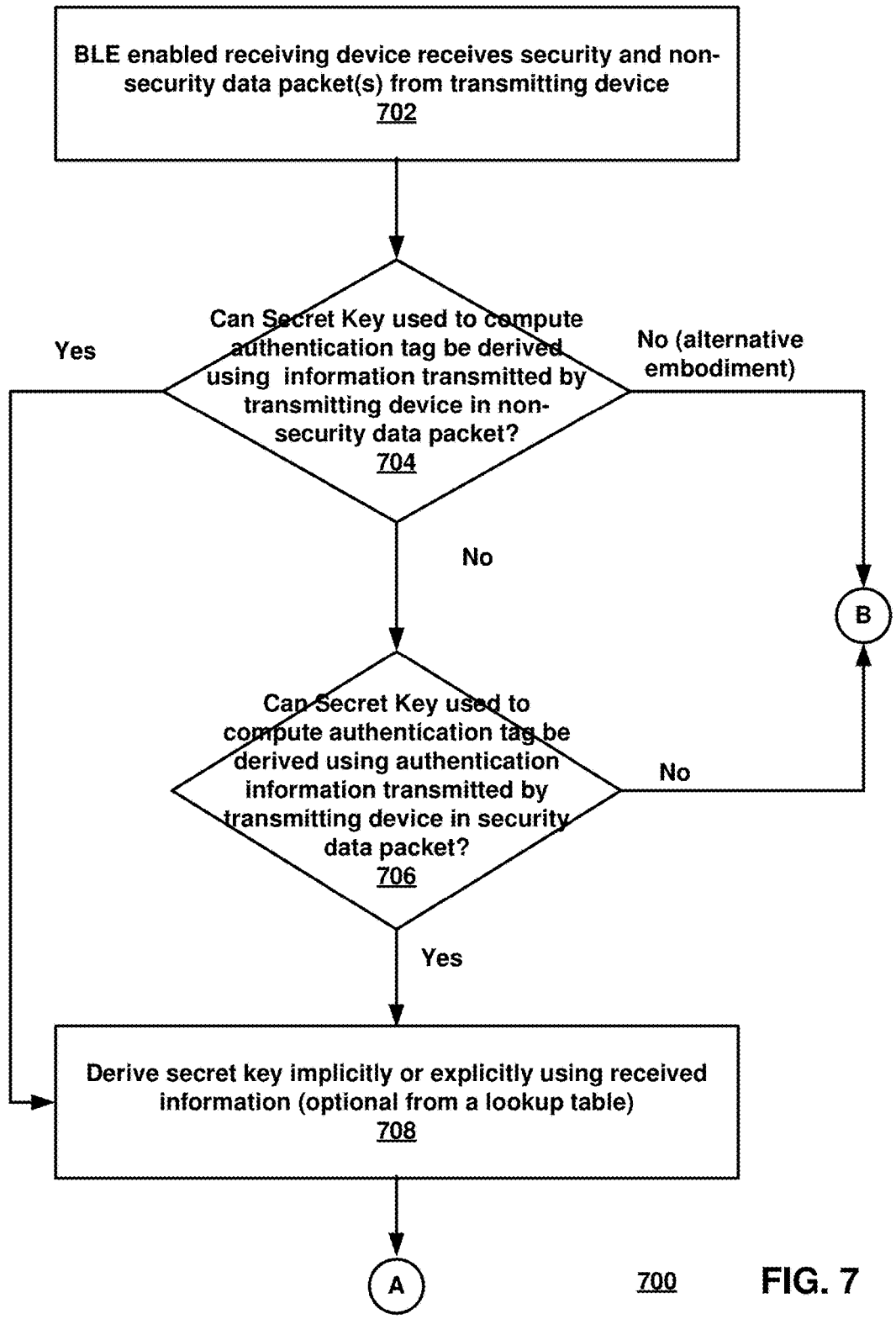
FIGS. 7 & 8 illustrate a flowchart describing the operations of a receiving device, according to one embodiment of the present invention.
Figure 8:
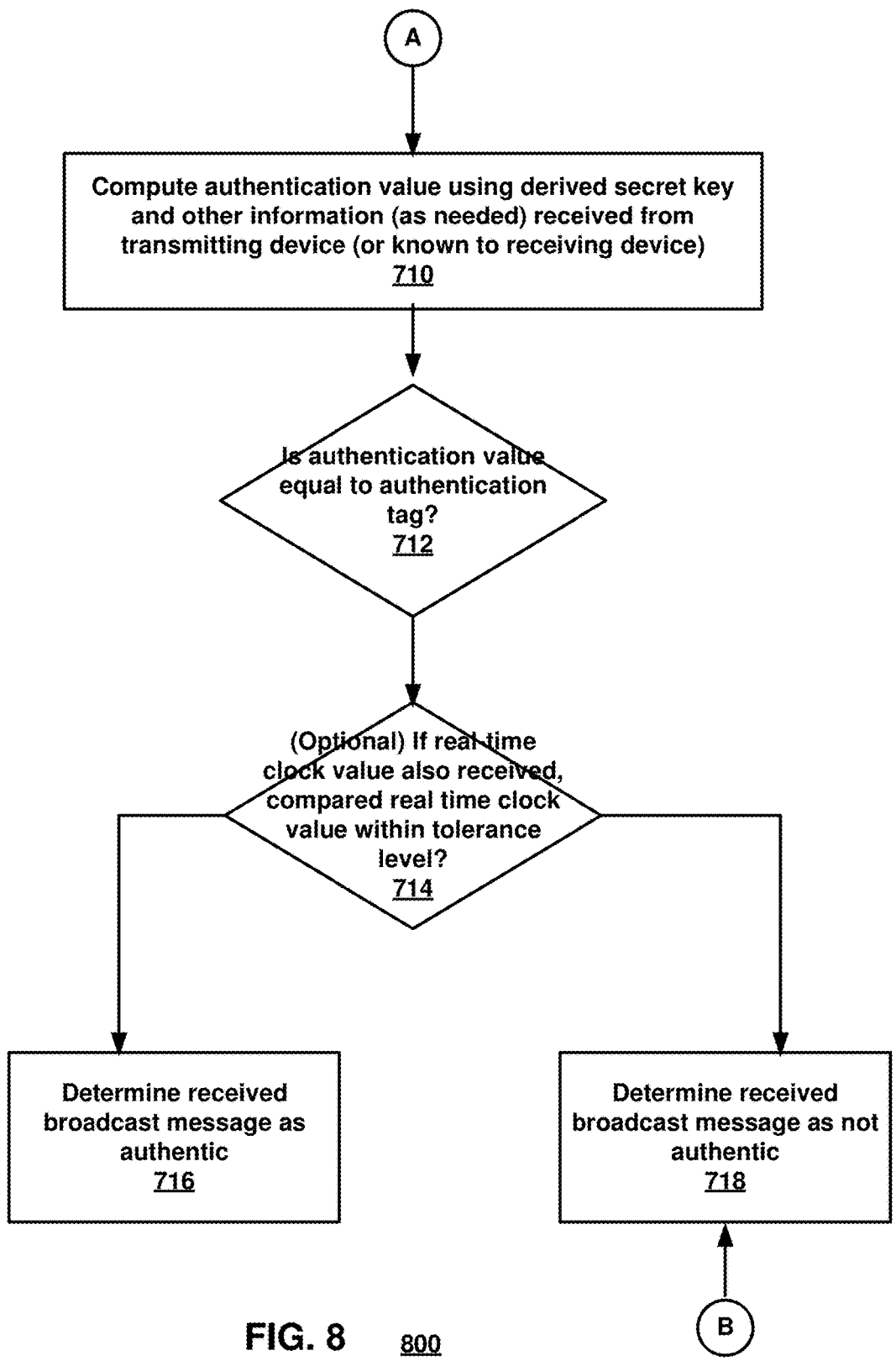

FIGS. 7 & 8 illustrate flowcharts 700 and 800 describing the operations of a receiving device, according to one embodiment of the present invention. Flowchart 700 determines if a secret key can derived by the receiving device based on the information provided by the transmitting device, and flowchart 800 determines the authenticity of the transmitted data from the transmitting device received in the receiving device. Flowcharts 700 and 800 provide the operations of a receiving device, according to one embodiment. As illustrated, at block 702 the receiving device receives the security and non-security data packets from the transmitting device/beacon. At 704, the receiving device determines whether the secret key can be derived using information provided by the transmitting device in the non-security data packet. In one embodiment, the information in the non-security data packet can include at least part of the transmitting device's identification information (as referred to beacon critical data herein). If the determination is in the affirmative, at 708, the secret key is implicitly or explicitly derived using the information. In an optional embodiment, the secret key is derived from a lookup table using the received information. However, if the secret key cannot be derived from the non-security data packet (e.g., from the transmitting device's identification information), at 706 the receiving device determines whether the secret key can be derived using at least part of the authentication information received in ADU 226. In one embodiment, the secret key can be derived using information provided in AKI field 232, as described above herein. If the secret key can be derived then control flows to 708, as described. Otherwise, control flows to 718 where it is determined that received broadcast message (in the non-security data packet) is not authentic. In yet an alternative embodiment, if, at 704, it is determined that the transmitting device information cannot be used to derive the secret key, control can directly flow to 718 where it is determined that received broadcast message (in the non-security data packet) is not authentic.

Once the secret key has been derived, as illustrated by block 708, at 710 the receiving device can compute an authentication value using the derived secret key (and optionally further using any information received from the receiving device in the form of a scan response request data packet, like any information in the MAC address field, as described herein). At 712 the computed authentication value is compared to the authentication tag.

In an alternative embodiment, as described herein, in order to prevent creating cloned beacons which observe multiple transmitted data packets with authentication tags from a secure beacon/BLE enabled peripheral and reproduce a sequence of corresponding packets in the clone beacon/BLE enabled peripheral, a real-time clock value can be used in time varying field 230. Thus, in this alternative embodiment, at 714, the receiving device can compare the real-time clock value received from the beacon/BLE enabled peripheral to its own real-time clock value and, in one embodiment, only allow actions when the computed authentication value is equal to the authentication tag (at 712) and when the beacon/BLE enabled peripheral's real-time clock values and receiver's real-time clock values are sufficiently close to one another (at 714). The acceptable difference in the real-time clock values depends upon the required security of the system application and the expected tolerances in the beacon and receiving devices' real-time clock implementations. If the computed authentication value is determined to be equal to the authentication tag (and optionally the real-time clock values are determined to equal or substantially equal) then at 716 it is determined that the received broadcast message in the non-security data packet is authentic. However, if the determination at 712 and/or 714 fails, then at 718 the receiving device determines that the broadcast message is not authentic.

Figure 9:
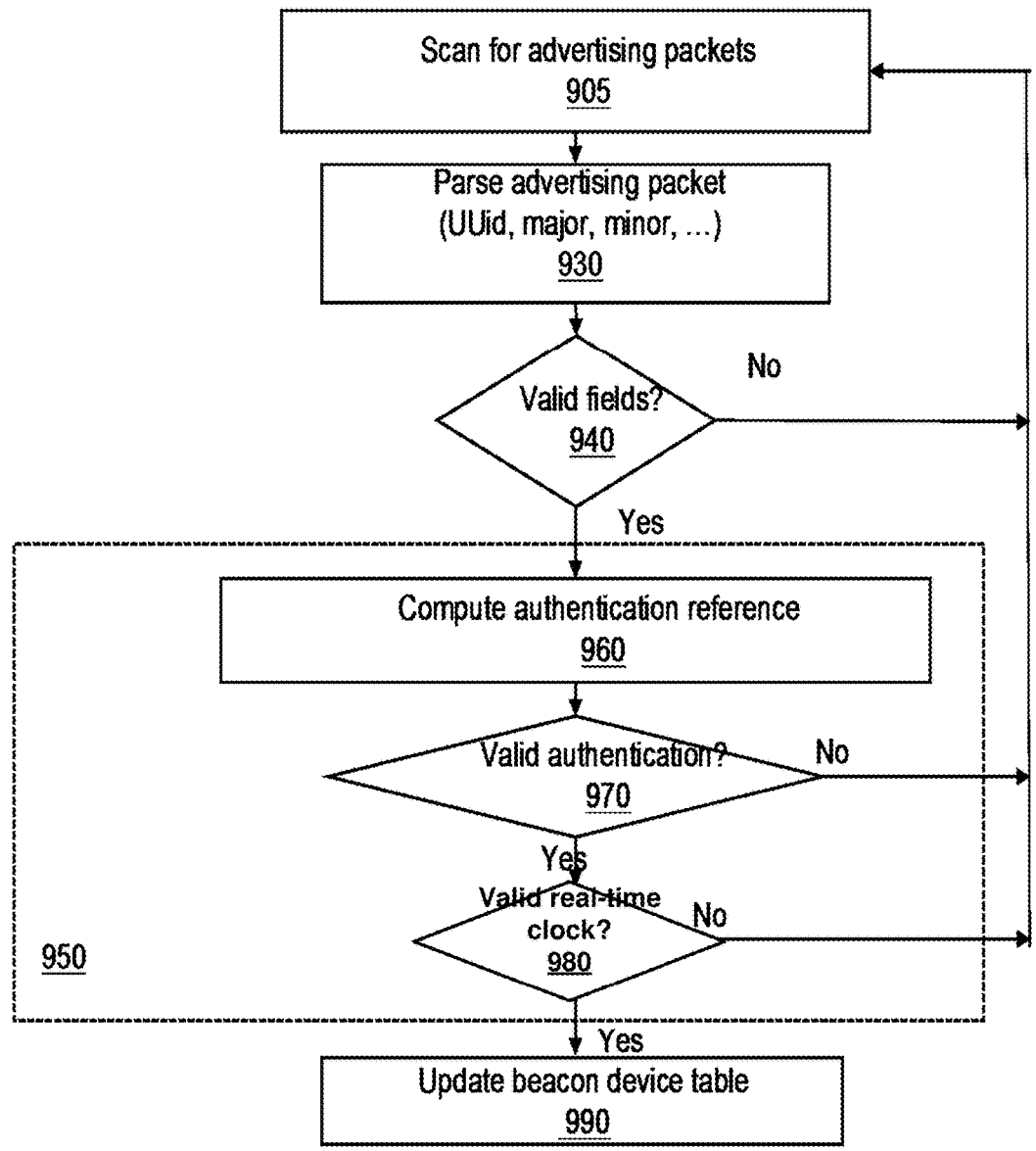
FIG. 9 illustrates a flowchart describing the operations of a receiving secure beacon data by a device, with the authentication information in a BLE advertising packet, according to one embodiment of the present invention.

FIG. 9 illustrates a flowchart 900 describing the operations of a receiving secure beacon data by a device, with the authentication information in a BLE advertising packet, according to one embodiment of the present invention. At block 905, advertising data packets are received by scanning for their existence using a BLE receiver and parsed according to the BLE advertising packet specification at 930. Validity checks 940 are performed to determine whether the beacon critical information is valid, for example, by implementing an allowable list (i.e., white-list) of permissible beacon UUID values. At 950 the operations are required in order to authenticate the received advertising packet and to check for possible packet duplication. Validity checks 940 can be performed before, as shown, or after authentication operations 950. If the received packet is authenticated successfully, then the remaining operations 990, including updating the beacon device table, determining location state changes, and propagating state change indications are performed. Thus, successful authentication of the received packet becomes a qualifier to be implemented prior to the remaining conventional beacon receive data processing operations.

The authentication operations 950 include computing the message authentication code value for the transmitted beacon data 960, comparing the value to the HMAC value included in the advertising data packet 970, and checking that the real-time clock value, if present in time-varying data field 230, does not indicate that the packet is likely to be a duplicate by comparing its value to the receiver's own real-time clock value 980. The real-time clock value comparison can be performed after the HMAC comparison, as shown, or prior to HMAC comparison. In order to compute the message authenticate code tag, the receiver needs to determine the mutually shared secret key from either the context of the beacon data information or the AKI data field. If the secret key cannot be determined, the received packet cannot be authenticated and update operations 990 should not be performed. In some embodiments, it may be desirable to generate an external event that indicates that beacon data was received for which there was no mutually shared secret, so that a receiving device may be configured in order to properly receive future secured advertising packets, for example, prompting for manual key entry or automatic key learning through some other means.

When the authentication information is transmitted in alternating modified and regular advertising packets, it is necessary to receive both the conventional beacon data packet and the security data packet in operation 905 since both information sources are required (i.e., the beacon data and its authentication data). However, since parsing of the advertising data packets is independent of the authentication packet until it becomes necessary to compute the authentication value in operation 950, the receiving operations prior to operations 950 may be interleaved. For example, the conventional beacon data packet may be parsed and checked for errors prior to receiving the authentication packet. In the event that a receiver does not receive the corresponding security data packet associated with a conventional beacon data packet within a predetermined amount of time, the processing should continue as if the received packet did not successfully authenticate in order to prevent a stall in the event of packet loss.

Figure 10:
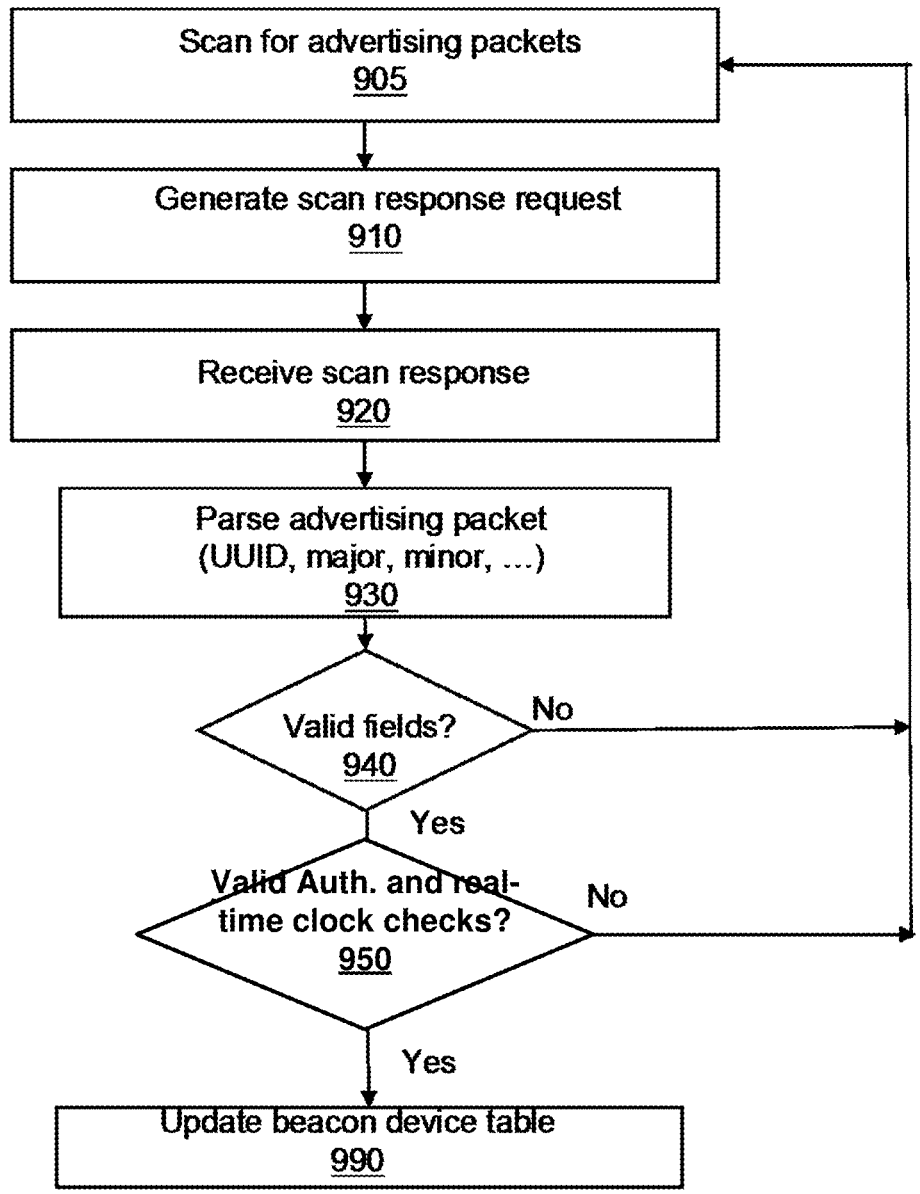
FIG. 10 illustrates a flowchart describing the operations of a receiving secure beacon data by a device, with the authentication information in a BLE scan response packet, according to one embodiment of the present invention.

FIG. 10 illustrates a flowchart 1000 describing the operations of receiving secure beacon data by a device, with the authentication information in a BLE scan response packet, according to one embodiment of the present invention. In order to cause the beacon to generate a scan response data packet, the receiver generates a scan response request and transmits it to the beacon 910. The scan response request may be transmitted as soon as the advertising packet is received by the receiver, as shown, or the scan response request may be generated only if the received beacon data is found to be valid. The advantage of the latter implementation, not shown, is that if the received UUID is not in the receiver's white-list of permissible UUID values, for example, there is no need to perform further checks, and so there is no need to receive the authentication information and the scan response data packet may not be necessary, so the receiver may not need to generate the scan response request, which conserves RF channel bandwidth and the devices' power.

In certain embodiments where the transmitting device requires information from receiver device (e.g., from the receiver's MAC address field) to compute the secret key, and the scan response request is transmitted by the receiver, then the receiver device must wait until the scan response request is received at 920 in order to authenticate the advertising data packet using the received scan response packet. However, if information from the receiver device is not needed by the transmitting device to compute the secret key, then the receiver device would not need to wait until the scan response request is received at 920. If the scan response packet is not received within a predetermined period of time, the receiver should ignore the received advertising packet or otherwise treat it substantially the same as advertising information which has not been authenticated. As described previously, it is preferable in certain embodiments of the invention that the receiving device generates substantially random values for its MAC address field for each generated scan response request to the beacon. The beacon can make use of this time-varying value in computing the message authentication code tag to be transmitted from the beacon to the receiver device, which improves overall system security.

Once the scan response data packet has been received, the remaining operations 950, 990 are substantially the same as shown in FIG. 9. The authentication information in the scan response packet is parsed and the message authentication code value is computed over the appropriate fields of the received advertising packet and scan response packet using the secret key. The transmitted and computed message authentication code values are compared on a bit-by-by basis. When the RTC field 230 is present in the ADU and represents a real-time clock value, the transmitted real-time clock value and the receiver's real-time clock values are compared in order to determine if the difference is within a predetermined threshold.

When active scanning is implemented in the system, the receiver may send information (e.g., a value known to the receiver) in the BLE scan response request data packet to the beacon that includes a data field which is used in the subsequent determination of the HMAC authentication tag calculated in the beacon, according to one embodiment of the invention described previously. This feature improves the overall system protection against the deleterious consequences of counterfeit duplication of beacon data. In certain embodiments, it may be desirable for the beacon implementation to have a capability to determine the authenticity of data packets received from the receiving devices. According to this embodiment of the invention, the scan response request data packet, transmitted from the receiving device to the beacon, includes a data field determined by certain parts of the beacon's advertising data packet and a shared secret value between the beacon and the receiving device. This shared secret value may be the same as, but is not required to be the same as, the shared secret value used in the determination of the HMAC value in the beacon. The shared secret value may be determined implicitly or explicitly through the context of the advertising data packet in a manner similar to that described previously for determining the secret key value used in the HMAC determination, for example, by using a table-lookup based on the UUID value. For example, the receiver may calculate a secure message authentication code value, as described previously, from certain parts of the advertising data packet using the shared secret value. In a standard BLE scan response request data packet, the available receiver address field is limited to only six (6) bytes, so the resulting code tag value may require truncation. The possibly truncated message authentication code value is sent to the beacon in the scan response request receiver address field. The particular message authentication code algorithm used to compute the message authentication code tag may be the same as, but is not required to be the same as, the message authentication code algorithm used in the HMAC calculation. The beacon device can determine from the received scan response request data packet if the received scan response request's address field corresponds to the message authentication code value by comparing the received and expected values. The expected value is determined in the beacon by computing the message authentication code value using the same algorithm over the certain parts of the advertising packet data. Thus, according to the invention, the beacon may use the scan response request data packet to validate the received scan response request in a manner similar to how the receiver uses the received scan response data packet to validate the beacon data. The advertising data packet may preferably include time-varying data, so that the expected received tag value in the scan response request data packet changes accordingly.

In the event the beacon determines the received scan response request data packet is invalid, the system designer determines whether the beacon sends the corresponding scan response data packet, or whether the beacon sends a different scan response data packet, for example, a data packet omitting the HMAC authentication field, or whether the beacon does not send the scan response data packet. Note that this implementation does not prevent an unauthorized receiver within range of the beacon's transmitted RF signal from receiving the scan response data packet if an authorized receiver, also within RF range, generates a valid scan response request data packet.

In certain embodiments of the invention, when the authentication information is included in the advertising data packet, it may be divided among a plurality of advertising packets. In certain embodiments of the invention, when the authentication information is included in the scan response data packet, it may be divided among a plurality of scan response packets, each of which requires a scan response request transmitted by the receiver. In certain embodiments of the invention, the authentication information may be divided among a plurality of advertising and scan response data packets.

Figure 11:
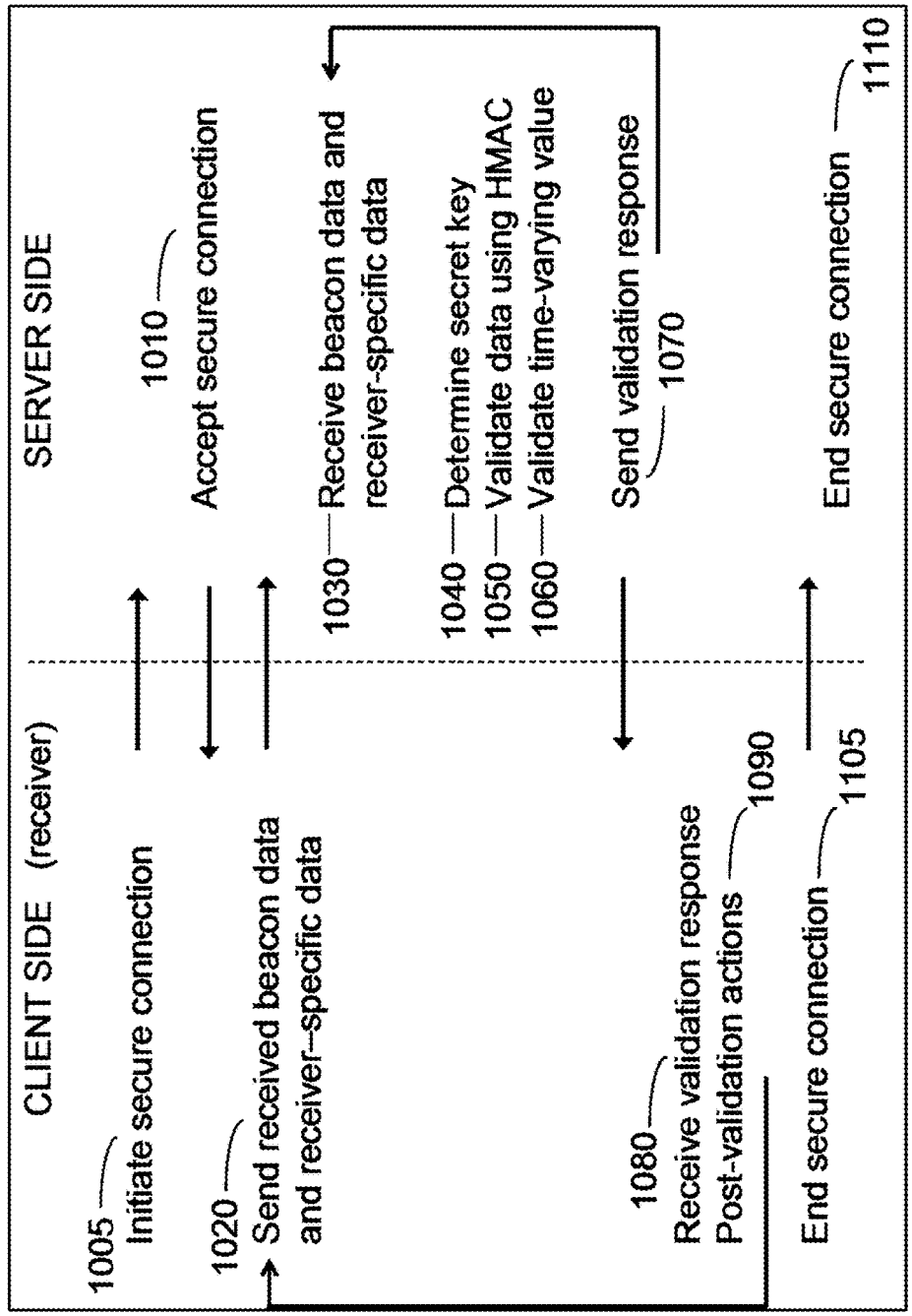
FIG. 11 illustrates a representation of a message flow where the validation of received beacon data is implemented using client-server architecture over a secure network connection, with the receiving device acting as the client and the remote server performing the validation functions, according to one embodiment of the present invention.

In certain embodiments of the invention, it may be desirable that the receiving device does not perform the validation of the message authentication code and time-varying value directly on the receiving device itself, but instead performs the validation actions through network access from the receiving device to a remote server. In this implementation, the receiving device sends the received beacon data protected by the message authentication code, including the received message authentication code value, to a server through a secure bidirectional communications connection. The preferred communications connection message flow corresponds to client server architecture, as shown in FIG. 11. The implementation of the secure connection to the remote server is independent of the BLE transfer between the receiver and the beacon, and the secure connection is typically implemented with other communication technologies available on the receiver devices, for example, Wi-Fi or cellular data.

FIG. 11 illustrates a representation of a message flow 1100 where the validation of received beacon data is implemented using client-server architecture over a secure network connection, with the receiving device acting as the client and the remote server performing the validation functions, according to one embodiment of the present invention. With reference to FIG. 11, to establish the connection, the receiver (i.e., client) initiates a secure connection 1005 to the server, preferably through the combination of standard Internet techniques such as HTTPS (Hypertext Protocol Transfer Secure) and RESTful (representational state transfer) protocols. Since session setup may be complex and require significant receiver device and server resources, it is preferable to maintain the HTTPS connection for a plurality of beacon data validations. The decision when to end the secure connection between the receiver and the server 1105, 1110 can be made by the receiver or the server on the basis of total elapsed time or timeout from last received beacon data or other technique. In the event of a timeout, the receiver initiates a new connection to the remote server 1005 when it is necessary to validate or in expectation of validating new beacon data. Upon acceptance of the connection request 1010 from the receiver to the server, the server and receiver negotiate appropriate security parameters and exchange information necessary to convey at least authenticated and possibly encrypted data between the receiver and the server for the remainder of the secure session. When the receiver has received beacon data to validate, it sends the received beacon data together with receiver-specific information to the server 1020. The server waits for and subsequently receives the information 1030 and determines whether the received data is authentic by computing the message authentication code tag (HMAC) value and comparing it to the received tag value 1050. The server determines the corresponding secret key value 1040 to use in the determination of the message authentication code value through the context information in the received data. The server can also determine the validity of the time-varying value 1600 in the received data. When the time-varying value corresponds to a real-time clock, the server may use a comparison time value determined from its own time reference or a value sent by the receiver to the server in the receiver-specific data corresponding to the receiver's clock. An advantage of the server using its own time reference is that it lessens the importance of having a tamper-resistant and accurate clock implemented on the receiver device itself. In general, servers are operated in well-controlled, tamper resistant environments, where highly accurate time references are available. A disadvantage of the technique is that network access latencies are introduced through the remote server access, which increases the time implementation ambiguity and adds delays in the overall time required for beacon data authentication in the receiver. In the active scanning implementation of the system, described previously, where the receiver sends a value to use in the message authentication code calculation to the beacon in the BLE scan response request packet, the value is also sent by the receiver to the remote server with the received beacon data as part of the receiver-specific data. The remote server determines if the received beacon data is authentic and may determine if the time-varying value is valid. The server sends a response 1070 to the receiver through the secure connection which indicates whether the received data is authentic and may indicate whether the time-varying value is within prescribed tolerances. The server may also send a response to the receiver device which includes the server's time reference, so that the receiver device may directly determine if the time-varying value is valid.

An advantage of the client server architecture described above is that the receiver device is not required to directly know any of the beacon secret keys. The confidential aspect of the receiver design relates to the secure connection to the remote server and not to the beacons. Thus, if receiver device security is breached, the beacon's security is unaffected. The beacon's security is deleteriously affected if the secret key table in the remote server is accessed in an unauthorized manner, but this is less likely to occur because of the server's well-controlled operating environment. In general, it may be easier to remove the authorization of a specific receiver device from the accessing the remote server than re-programming new secret keys into beacon devices. The receiver device requires a secure connection to the remote server primarily for authentication so that the receiver does not receive false (i.e., spoofed or counterfeit) messages regarding the authentication of the received beacon data. Thus, authentication of the secure connection between the receiver and remote server is mandatory but encryption is optional.

The receiver waits for and receives the validation response from the server 1080 and determines actions 1090 to perform in the same manner as if the validation had been performed directly on the device itself, for example, updating the beacon table and determining whether to perform certain proximity-based actions. If the validation response is not received within a specified amount of time determined by the system designer, the receiver device may re-attempt validation to the server in the current secure session or in a new session. In general, when it is not possible to validate the received beacon data, the system can be implemented to i) ignore the received beacon data, thus performing no actions in the receiver, ii) perform actions pending a later attempted validation of the beacon data and possible revocation of actions if validation subsequently fails, or iii) perform actions and indicate lack of validated beacon data associated with those actions.

In the client server architecture described above, the server provides a data validation service for the received beacon data over a secure connection to the receiving device. The receiving device may use other services, which may be implemented on the same or other remote servers using the same or different secure connections, in order to perform post-validation actions, for example, a service that maintains a list of received beacon parameters across a plurality of receivers in order to provide proximity information to beacons which may be out-of-range of a particular receiver but in-range of another receiver. In general, the post validation services can be implemented independent of the validation service described above herein. This is advantageous when the validation service provider may be unrelated to the actual user of validated beacon information. For example, a centralized service provider may provide beacon provisioning and validation services for many users, while a specific beacon user, for example, a retail operation, may provide a service to use the actual beacon information to assist in geo-location within a store.

In certain embodiments of the invention, the validation of the received beacon data on the receiver may be implemented either by the client server access technique described above, or direct on the receiver device, or a combination thereof. When it is more desirable to protect receiving from the deleterious effects of accidental alteration or duplication of transmitted beacon data instead of intentional alteration or duplication, the secret key may be publically known or the secret key can be omitted.

The system(s) and method(s) described above may be implemented for applications other than beacons. The techniques are suitable for securing arbitrary broadcast data payloads in BLE connectionless (i.e., advertising and scan response) inter-device communication. The security provides for protection of advertising packet payload data against alteration and duplication in a manner which preserves the low communications overhead advantages of operating in the connectionless state.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

FIG. 12 is a block diagram illustrating a data processing system such as a computing system 1200 which may be used with one embodiment of the invention. For example, system 1200 may be implemented as part of a configuration that provides secure BLE communications using any technique described herein. In one embodiment, system 1200 may represent the BLE enabled transmitting device, BLE enabled receiving device, and/or a server, as described herein. System 1200 may have a distributed architecture having dispersed units coupled through a network, or all of its components may be integrated into a single unit.

For example, computing system 1200 may represents any of data processing systems described above performing any of the processes or methods described above. System 1200 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1200 is intended to show a high level view of many components of the computer system. However, it is to be understood that additional or fewer components may be present in certain implementations and furthermore, different arrangement of the components shown may occur in other implementations. System 1200 may represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1200 includes processor 1201, memory 1203, and devices 1205-1208 via a bus or an interconnect 1222. Processor 1201 may represent a single processor or multiple processors with a single processor core or multiple processor cores included therein. Processor 1201 may represent one or more general-purpose processors such as a microprocessor, a central processing unit (CPU), or the like. More particularly, processor 1201 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1201 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1201, which may be a low power multi-core processor socket such as an ultra low voltage processor, may act as a main processing unit and central hub for communication with the various components of the system. Such processor can be implemented as a system on chip (SoC). In one embodiment, processor 1201 may be an Intel® Architecture Core™-based processor such as an i3, i5, i12 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1201 is configured to execute instructions for performing the operations and methods discussed herein. System 1200 further includes a graphics interface that communicates with graphics subsystem 1204, which may include a display controller and/or a display device. Processor 1201 may communicate with memory 1203, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 2012-2E (published April 2012), or a next generation LPDDR standard to be referred to as LPDDR3 that will offer extensions to LPDDR2 to increase bandwidth. As examples, 2/4/8 gigabytes (GB) of system memory may be present and can be coupled to processor 812 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1203 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1203 may store information including sequences of executable program instructions that are executed by processor 1201, or any other device. For example, executable code and/or data of a variety of operating systems, device drivers, firmware (e.g., input output basic system or BIOS), and/or applications can be loaded in memory 1203 and executed by processor 1201. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks. System 1200 may further include IO devices such as devices 1205-1208, including wireless transceiver(s) 1205, input device(s) 1206, audio IO device(s) 1207, and other IO devices 1208. Wireless transceiver 1205 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 1206 may include a mouse, a touch pad, a touch sensitive screen (which may be integrated with display device 1204), a pointer device such as a stylus, and/or a keyboard (e.g., physical keyboard or a virtual keyboard displayed as part of a touch sensitive screen). For example, input device 1206 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen. Audio IO device 1207 may include a speaker and/or a microphone to facilitate voice-enabled functions, such as voice recognition, voice replication, digital recording, and/or telephony functions. Other optional devices 1208 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1208 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1207 via a sensor hub (not shown), while other devices such as a keyboard or thermal sensor may be controlled by an embedded controller (not shown), dependent upon the specific configuration or design of system 1200.

To provide for persistent storage of information such as data, applications, one or more operating systems and so forth, a mass storage (not shown) may also couple to processor 1201. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1201, e.g., via a serial peripheral interface (SPI). This flash device may provide for non-volatile storage of system software, including a basic input/output software (BIOS) as well as other firmware of the system.

Note that while system 1200 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium to provide secure BLE communications are described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method to secure a broadcast message using low powered wireless (LPW) technology, comprising:
receiving, by a LPW receiver device, a security tag and a broadcast message transmitted from a LPW transmitter device, the broadcast message including at least a first data related to the LPW transmitter device, the security tag computed using a secret key;
determining the secret key using at least one of the security tag or at least the first data;
computing a security value using the secret key;
comparing the security value with the security tag; and
determining that the broadcast message is secure when the security value is equal to the security tag and wherein determining that the broadcast message is secure further includes determining that a first time varying value known to the LPW receiver device is equal, or approximately equal, to a second time varying value, the second time varying value transmitted by the LPW transmitter device to the LPW receiver device;
wherein the LPW receiver and transmitter devices are not paired and communicate with each other in a non-connected state, and wherein the broadcast message further includes information using which the LPW receiver device performs specific actions.

2. The method of claim 1, wherein determining that the first time varying value is approximately equal to the second time varying value, a difference of the first time varying value and the second time varying value is determined to be less than a predetermined threshold value.

3. The method of claim 1, wherein the first and second time varying values are a counter, a counter corresponding to a real-time clock, a real-time clock, or a combination thereof.

4. The method of claim 1, wherein the second time varying value is transmitted by the LPW transmitter device in at least one of a security data packet or a non-security data packet.

5. The method of claim 4, wherein the security tag is included in the security data packet, and the broadcast message is included in the non-security data packet.

6. The method of claim 4, wherein the non-security data packet is an advertising data packet.

7. The method of claim 1, wherein the first and second time varying values are non-repetitive.

8. A non-transitory computer readable medium comprising instructions which when executed by a processing system of a low powered wireless (LPW) receiver device executes a method to secure a broadcast message using LPW technology, comprising:
receiving a security tag and a broadcast message transmitted from a LPW transmitter device, the broadcast message including at least a first data related to the LPW transmitter device, the security tag computed using a secret key;
determining the secret key using at least one of the security tag or at least the first data;
computing a security value using the secret key;
comparing the security value with the security tag; and
determining that the broadcast message is secure when the security value is equal to the security tag and wherein determining that the broadcast message is secure further includes determining that a first time varying value known to the LPW receiver device is equal, or approximately equal, to a second time varying value, the second time varying value transmitted by the LPW transmitter device to the LPW receiver device;
wherein the LPW receiver and transmitter devices are not paired and communicate with each other in a non-connected state, and wherein the broadcast message further includes information using which the LPW receiver device performs specific actions.

9. The non-transitory computer readable medium of claim 8, wherein determining that the first time varying value is approximately equal to the second time varying value, a difference of the first time varying value and the second time varying value is determined to be less than a predetermined threshold value.

10. The non-transitory computer readable medium of claim 8, wherein the first and second time varying values are a counter, a counter corresponding to a real-time clock, a real-time clock, or a combination thereof.

11. The non-transitory computer readable medium of claim 8, wherein the second time varying value is transmitted by the LPW transmitter device in at least one of a security data packet or a non-security data packet.

12. The non-transitory computer readable medium of claim 11, wherein the security tag is included in the security data packet, and the broadcast message is included in the non-security data packet.

13. The non-transitory computer readable medium of claim 11, wherein the non-security data packet is an advertising data packet.

14. The non-transitory computer readable medium of claim 8, wherein the first and second time varying values are non-repetitive.

15. A low powered wireless (LPW) transmitter device to secure a broadcast message, comprising:
a memory device;
a processing system comprising at least one core coupled to the memory device, the processing system configured to transmit to a LPW receiver device, a security tag and a broadcast message, the broadcast message including at least a first data related to the LPW transmitter device, the security tag computed using a secret key;
wherein the LPW receiver device is further configured to:
determine the secret key using at least one of the security tag or the at least first data;
compute a security value using the secret key;
compare the security value with the security tag; and
determine that the broadcast message is secure when the security value is equal to the security tag and wherein determining that the broadcast message is secure further includes determining that a first time varying value known to the LPW receiver device is equal, or approximately equal, to a second time varying value, the second time varying value transmitted by the LPW transmitter device to the LPW receiver device;

and wherein the LPW receiver and transmitter devices are not paired and communicate with each other in a non-connected state, and wherein the broadcast message further includes information using which the LPW receiver device performs specific actions.

16. The device of claim 15, wherein determining that the first time varying value is approximately equal to the second time varying value, a difference of the first time varying value and the second time varying value is determined to be less than a predetermined threshold value.

17. The device of claim 15, wherein the first and second time varying values are a counter, a counter corresponding to a real-time clock, a real-time clock, or a combination thereof.

18. The device of claim 15, wherein the second time varying value is transmitted by the LPW transmitter device in at least one of a security data packet or a non-security data packet, and wherein the non-security data packet is an advertising data packet.

19. The device of claim 18, wherein the security tag is included in the security data packet, and the broadcast message is included in the non-security data packet.

20. The device of claim 15, wherein the first and second time varying values are non-repetitive.

* * * * *